(12) United States Patent
Lutz et al.

(10) Patent No.: US 12,197,333 B2
(45) Date of Patent: *Jan. 14, 2025

(54) PRELOADED CONTENT SELECTION GRAPH FOR RAPID RETRIEVAL

(71) Applicant: Home Box Office, Inc., New York, NY (US)

(72) Inventors: Jonathan David Lutz, Seattle, WA (US); Allen Arthur Gay, Shoreline, WA (US); Dylan Carney, Seattle, WA (US)

(73) Assignee: HOME BOX OFFICE, INC., New York, NY (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/823,694

(22) Filed: Aug. 31, 2022

(65) Prior Publication Data

US 2022/0414012 A1 Dec. 29, 2022

Related U.S. Application Data

(63) Continuation of application No. 16/720,822, filed on Dec. 19, 2019, now Pat. No. 11,474,943.

(Continued)

(51) Int. Cl.
*G06F 12/0862* (2016.01)
*G06F 16/901* (2019.01)
*G06F 16/957* (2019.01)

(52) U.S. Cl.
CPC ...... *G06F 12/0862* (2013.01); *G06F 16/9024* (2019.01); *G06F 16/9574* (2019.01); *G06F 2212/602* (2013.01)

(58) Field of Classification Search
CPC ............. G06F 12/0862; G06F 16/9024; G06F 16/9574; G06F 2212/602; G06F 16/172; H04N 21/858; H04N 21/84
See application file for complete search history.

(56) References Cited

U.S. PATENT DOCUMENTS 6,678,415 B1 1/2004 Popat et al.
7,124,060 B1 10/2006 Eriksson et al.
(Continued)

FOREIGN PATENT DOCUMENTS

EP 3 550 464 A1 10/2019
KR 10-1429046 B1 8/2014
(Continued)

OTHER PUBLICATIONS

Notice of Allowance received for U.S. Appl. No. 16/720,825 dated Jun. 28, 2023, 43 pages.
(Continued)

*Primary Examiner* — Jorge A Casanova
(74) *Attorney, Agent, or Firm* — Amin, Turocy & Watson, LLP

(57) ABSTRACT

The described technology is generally directed towards maintaining content selection graphs in an in-memory content selection graph data store in association with respective start times that indicates when the respective graphs become active. When a request to return content selection data is received, an active graph that corresponds to the request and the current time is accessed to obtain the requested content selection data. The response data can be prebuilt, e.g., in a set of active graphs for different client types, so that the response can be returned generally as is from the active graph in the set for that particular client type. A Redis cache can be used to maintain the various graph sets, including the active graph sets and graph sets that will become active at a future time.

20 Claims, 16 Drawing Sheets

Related U.S. Application Data

(60) Provisional application No. 62/783,263, filed on Dec. 21, 2018.

(56) References Cited

U.S. PATENT DOCUMENTS

| | | | |
|---|---|---|---|
| 7,739,233 | B1 | 6/2010 | Ghemawat et al. |
| 8,332,414 | B2 | 12/2012 | Nguyen et al. |
| 8,516,114 | B2 | 8/2013 | Banavar et al. |
| 8,938,668 | B2 | 1/2015 | Blas et al. |
| 8,949,420 | B2 | 2/2015 | Banavar et al. |
| 9,059,938 | B1 | 6/2015 | Strand et al. |
| 9,338,233 | B2 | 5/2016 | Raleigh et al. |
| 9,414,222 | B1 | 8/2016 | Dixon |
| 9,684,689 | B2 | 6/2017 | Arnady et al. |
| 9,996,501 | B1 | 6/2018 | Nelson et al. |
| 10,013,500 | B1 | 7/2018 | McClintock et al. |
| 11,269,768 | B2 | 3/2022 | Lutz et al. |
| 11,681,760 | B2 | 6/2023 | Ben-Ishay et al. |
| 2002/0007402 | A1 | 1/2002 | Thomas Huston et al. |
| 2003/0065501 | A1 | 4/2003 | Hamdan |
| 2003/0110297 | A1 | 6/2003 | Tabatabai et al. |
| 2003/0118297 | A1 | 6/2003 | Dunphy et al. |
| 2003/0187984 | A1 | 10/2003 | Banavar et al. |
| 2004/0107356 | A1 | 6/2004 | Shamoon et al. |
| 2004/0123320 | A1 | 6/2004 | Daily et al. |
| 2006/0085489 | A1 | 4/2006 | Tomic et al. |
| 2006/0265421 | A1 | 11/2006 | Ranasinghe et al. |
| 2007/0169030 | A1 | 7/2007 | Tarditi et al. |
| 2008/0071825 | A1 | 3/2008 | Guo |
| 2010/0049678 | A1 | 2/2010 | Huang et al. |
| 2011/0202848 | A1 | 8/2011 | Ismalon |
| 2011/0276603 | A1 | 11/2011 | Bojanic et al. |
| 2012/0011118 | A1 | 1/2012 | Gleicher et al. |
| 2013/0018849 | A1 | 1/2013 | Johnston et al. |
| 2013/0055065 | A1 | 2/2013 | DiBlas et al. |
| 2013/0060632 | A1 | 3/2013 | Gadhia et al. |
| 2013/0086131 | A1 | 8/2013 | Hunt et al. |
| 2013/0238761 | A1 | 9/2013 | Raleigh et al. |
| 2013/0254815 | A1 | 9/2013 | Pfeffer et al. |
| 2014/0032775 | A1 | 1/2014 | Abiezzi et al. |
| 2014/0195675 | A1 | 7/2014 | Silver et al. |
| 2014/0237345 | A1 | 8/2014 | Blas et al. |
| 2015/0200988 | A1 | 7/2015 | Cabanillas et al. |
| 2015/0201001 | A1 | 7/2015 | Cabanillas et al. |
| 2015/0331583 | A1 | 11/2015 | Zhang |
| 2016/0034306 | A1 | 2/2016 | Galdy et al. |
| 2016/0234290 | A1 | 8/2016 | Sharma |
| 2016/0253304 | A1 | 9/2016 | Evers et al. |
| 2016/0292305 | A1 | 10/2016 | Hu et al. |
| 2017/0006036 | A1 | 1/2017 | Bellingham |
| 2017/0103553 | A1 | 4/2017 | Busayarat et al. |
| 2017/0104838 | A1 | 4/2017 | Busayarat et al. |
| 2017/0109214 | A1 | 4/2017 | Raman et al. |
| 2017/0177333 | A1 | 6/2017 | Busayarat et al. |
| 2017/0195187 | A1 | 7/2017 | Bennett et al. |
| 2017/0201851 | A1 | 7/2017 | Huang et al. |
| 2017/0255875 | A1 | 9/2017 | Chien et al. |
| 2017/0279739 | A1 | 9/2017 | Gamal et al. |
| 2017/0302575 | A1 | 10/2017 | Ward et al. |
| 2017/0310723 | A1 | 10/2017 | Furtwangler |
| 2017/0324986 | A1 | 11/2017 | Gay et al. |
| 2017/0353577 | A1 | 12/2017 | Lutz et al. |
| 2017/0357575 | A1 | 12/2017 | Lee et al. |
| 2017/0364534 | A1 | 12/2017 | Zhang et al. |
| 2018/0089330 | A1 | 3/2018 | Smolic et al. |
| 2018/0192111 | A1 | 7/2018 | Legendre et al. |
| 2018/0210927 | A1 | 7/2018 | Karam et al. |
| 2018/0234310 | A1 | 8/2018 | Ingalls et al. |
| 2018/0239796 | A1 | 8/2018 | Song et al. |
| 2018/0295203 | A1 | 10/2018 | Wilde |
| 2018/0315248 | A1 | 11/2018 | Bastov et al. |
| 2018/0322176 | A1 | 11/2018 | Busayarat et al. |
| 2018/0349368 | A1 | 12/2018 | Bellingham et al. |
| 2018/0365155 | A1 | 12/2018 | Bryc |
| 2019/0019183 | A1 | 1/2019 | Karame et al. |
| 2019/0034780 | A1 | 1/2019 | Marin et al. |
| 2019/0258575 | A1 | 8/2019 | Dey et al. |
| 2019/0294721 | A1 | 9/2019 | Keifer et al. |
| 2019/0362263 | A1 | 11/2019 | Harris et al. |
| 2019/0384861 | A1 | 12/2019 | Ghoting et al. |
| 2020/0137443 | A1 | 4/2020 | McEnroe et al. |
| 2020/0167356 | A1 | 5/2020 | Panagoplos et al. |
| 2020/0201820 | A1 | 6/2020 | Lutz et al. |
| 2020/0201909 | A1 | 6/2020 | Das et al. |
| 2020/0201989 | A1 | 6/2020 | Shu et al. |
| 2020/0202246 | A1 | 6/2020 | Lin et al. |
| 2020/0264866 | A1 | 8/2020 | Collins et al. |
| 2020/0322306 | A1 | 10/2020 | Serena |
| 2021/0089452 | A1 | 3/2021 | Peng |

FOREIGN PATENT DOCUMENTS

| | | |
|---|---|---|
| WO | 2013/054305 A1 | 4/2013 |
| WO | 2018/222334 A1 | 12/2018 |

OTHER PUBLICATIONS

Non-Final office action received for U.S. Appl. No. 17/935,766 dated Jun. 22, 2023, 98 pages.
Notice of Allowance received for U.S. Appl. No. 17/549,593 dated Jul. 6, 2023, 6 pages.
Notice of Allowance received for U.S. Appl. No. 16/720,822 dated Aug. 17, 2022, 12 pages.
Final Office Action received for U.S. Appl. No. 16/720,825 dated Feb. 2, 2023, 44 pages.
Notice of Allowance received for U.S. Appl. No. 16/720,830 dated Aug. 23, 2022, 7 pages.
Non-Final Office Action received for U.S. Appl. No. 17/936,666 dated Jan. 19, 2023, 44 pages.
Notice of Allowance received for U.S. Appl. No. 16/720,834 dated Aug. 25, 2022, 6 pages.
Non-Final Office Action received for U.S. Appl. No. 17/549,593 dated Nov. 7, 2022, 58 pages.
Non-Final Office Action received for U.S. Appl. No. 17/648,555 dated Nov. 30, 2022, 45 pages.
Communication pursuant to Rules 94(3) EPC received for EP Patent Application Serial No. 19842986.2 dated Nov. 16, 2022, 6 pages.
Communication pursuant to Rules 94(3) EPC received for EP Patent Application Serial No. 19842983.9 dated Aug. 9, 2023, 6 pages.
Final Office Action received for U.S. Appl. No. 17/936,766 dated Sep. 21, 2023, 61 pages.
Decision to grant a European patent pursuant to Article 97(1) EPC received for EP Patent Application Serial No. 19845645.1 dated Aug. 18, 2023, 2 pages.
Notice of Allowance received for U.S. Appl. No. 17/935,766 dated Oct. 18, 2023, 26 pages.
Notice of Allowance received for U.S. Appl. No. 17/549,593 dated May 8, 2023, 20 pages.
Communication under Rule 71(3) EPC received for EP Patent Application Serial No. 19845645.1, dated Mar. 31, 2023, 75 pages.
Notice of Allowance received for U.S. Appl. No. 17/648,555 dated Mar. 13, 2023, 36 pages.
Non-Final Office Action received for U.S. Appl. No. 16/720,838 dated Jun. 30, 2021, 26 pages.
International Search Report and Written Opinion received for PCT Application Serial No. PCT/US19/068157 dated Apr. 8, 2020, 13 pages.
International Search Report and Written Opinion received for PCT Application Serial No. PCT/US2019/068158 dated Apr. 20, 2020, 13 pages.
International Search Report and Written Opinion received for PCT Application Serial No. PCT/US2019/068159 dated Mar. 6, 2020, 15 pages.
International Search Report and Written Opinion received for PCT Application Serial No. PCT/US2019/068160 dated Mar. 6, 2020, 14 pages.

(56) References Cited

OTHER PUBLICATIONS

International Search Report and Written Opinion received for PCT Application Serial No. PCT/US2019/068161 dated Mar. 4, 2020, 13 pages.
International Search Report and Written Opinion received for PCT Application Serial No. PCT/US2019/068162 dated May 8, 2020, 13 pages.
Non-Final Office Action received for U.S. Appl. No. 16/720,836 dated Apr. 21, 2021, 40 pages.
Non-Final Office Action received for U.S. Appl. No. 16/720,830 dated Jul. 9, 2021, 62 pages.
International Preliminary Report on Patentability for International Application No. PCT/US2019/068157 dated Jun. 16, 2021, 9 pages.
International Preliminary Report on Patentability for International Application No. PCT/US2019/068158 dated Jun. 16, 2021, 8 pages.
International Preliminary Report on Patentability for International Application No. PCT/US2019/068159 dated Jun. 16, 2021, 8 pages.
International Preliminary Report on Patentability for International Application No. PCT/US2019/068160 dated Jun. 16, 2021, 8 pages.
International Preliminary Report on Patentability for International Application No. PCT/US2019/068161 dated Jun. 16, 2021, 7 pages.
International Preliminary Report on Patentability for International Application No. PCT/US2019/068162 dated Jun. 16, 2021, 7 pages.
Non-Final Office Action received for U.S. Appl. No. 16/720,822 dated Aug. 9, 2021, 90 pages.
Non-Final Office Action received for U.S. Appl. No. 16/720,834 dated Aug. 26, 2021, 113 pages.
Communication pursuant to Rules 161(1) and 162 EPC received for EP Patent Application Serial No. 19842518.3 dated Jul. 28, 2021, 3 pages.
Communication pursuant to Rules 161(1) and 162 EPC received for EP Patent Application Serial No. 19842983.9 dated Jul. 28, 2021, 3 pages.
Communication pursuant to Rules 161(1) and 162 EPC received for EP Patent Application Serial No. 19842984.7 dated Jul. 28, 2021, 3 pages.
Communication pursuant to Rules 161(1) and 162 EPC received for EP Patent Application Serial No. 19842985.4 dated Jul. 28, 2021, 3 pages.
Communication pursuant to Rules 161(1) and 162 EPC received for EP Patent Application Serial No. 19842986.2 dated Jul. 28, 2021, 3 pages.
Communication pursuant to Rules 161(1) and 162 EPC received for EP Patent Application Serial No. 19845645.1 dated Jul. 28, 2021, 3 pages.
Final Office Action received for U.S. Appl. No. 16/720,822 dated Dec. 13, 2021, 49 pages.
Final Office Action received for U.S. Appl. No. 16/720,834 dated Dec. 13, 2021, 50 pages.
Final Office Action received for U.S. Appl. No. 16/720,830 dated Dec. 22, 2021, 73 pages.
Notice of Allowance received for U.S. Appl. No. 16/720,822 dated Jun. 1, 2022, 23 pages.
Non-Final Office Action received for U.S. Appl. No. 16/720,825 dated Jun. 9, 2022, 46 pages.
Non-Final Office Action received for U.S. Appl. No. 17/936,766 dated Mar. 29, 2024, 73 pages.
Summons to attend oral proceedings pursuant to Rule 115(1) EPC received for European Patent Application Serial No. 19842986.2 dated Feb. 8, 2024, 6 pages.
Communication pursuant to Article 94(3) received for European Patent Application Serial No. 19842518.3 dated Apr. 16, 2024, 5 pages.
Communication pursuant to Article 71(3) received for European Patent Application Serial No. 19842983.9 dated May 29, 2024, 77 pages.
Communication pursuant to Article 94(3) EPC received for EP Patent Application Serial No. 19842984.7 dated Oct. 28, 2024, 2 pages.
Final Office Action received for U.S. Appl. No. 17/936,766 dated Nov. 21, 2024, 70 pages.
Communication pursuant to Article 94(3) EPC received for EP Patent Application Serial No. 19842985.4 dated Oct. 31, 2024, 6 pages.

PRELOADED CONTENT SELECTION GRAPH FOR RAPID RETRIEVAL

CROSS-REFERENCE TO RELATED APPLICATIONS

This application is a continuation of non-provisional pending U.S. patent application Ser. No. 16/720,822, filed on Dec. 19, 2019, which claims priority to U.S. Provisional Patent Application No. 62/783,263, filed on Dec. 21, 2018, both entitled "PRELOADED CONTENT SELECTION GRAPH FOR RAPID RETRIEVAL." The entirety of the aforementioned applications are hereby incorporated by reference herein.

BACKGROUND

To allow users to select content, content providers, such as those that stream video content to subscribers, provide their subscribers with selection-related data on an interactive user interface. This typically includes user interface elements such as menus and icons/tiles representing the available content offerings, e.g., movies and television shows, with which users can interact to select content for playing. To this end, designers on an editorial team or the like may layout the various menus and/or select image sizes, resolutions, text and so on for the interactive menus of icons/tiles that represent the content, including determining colors, sizing items and so on.

When a user requests the data for content selection, the data needs to be retrieved, formatted/shaped based on client-specific details (e.g., including for the type of client device and software version requesting the data), and returned to the client requester. This can cause numerous problems when the number of requests spikes at a given time. For example, when the latest episode of a very popular program, such as Home Box Office, Inc.'s "Game of Thrones" is first made available for streaming, the number of simultaneous or near-simultaneous requests for the selection-related data needed to select the episode offering can overwhelm conventional data retrieval techniques.

BRIEF DESCRIPTION OF THE DRAWINGS

The technology described herein is illustrated by way of example and not limited in the accompanying figures in which like reference numerals indicate similar elements and in which.

DETAILED DESCRIPTION

Figure 1:
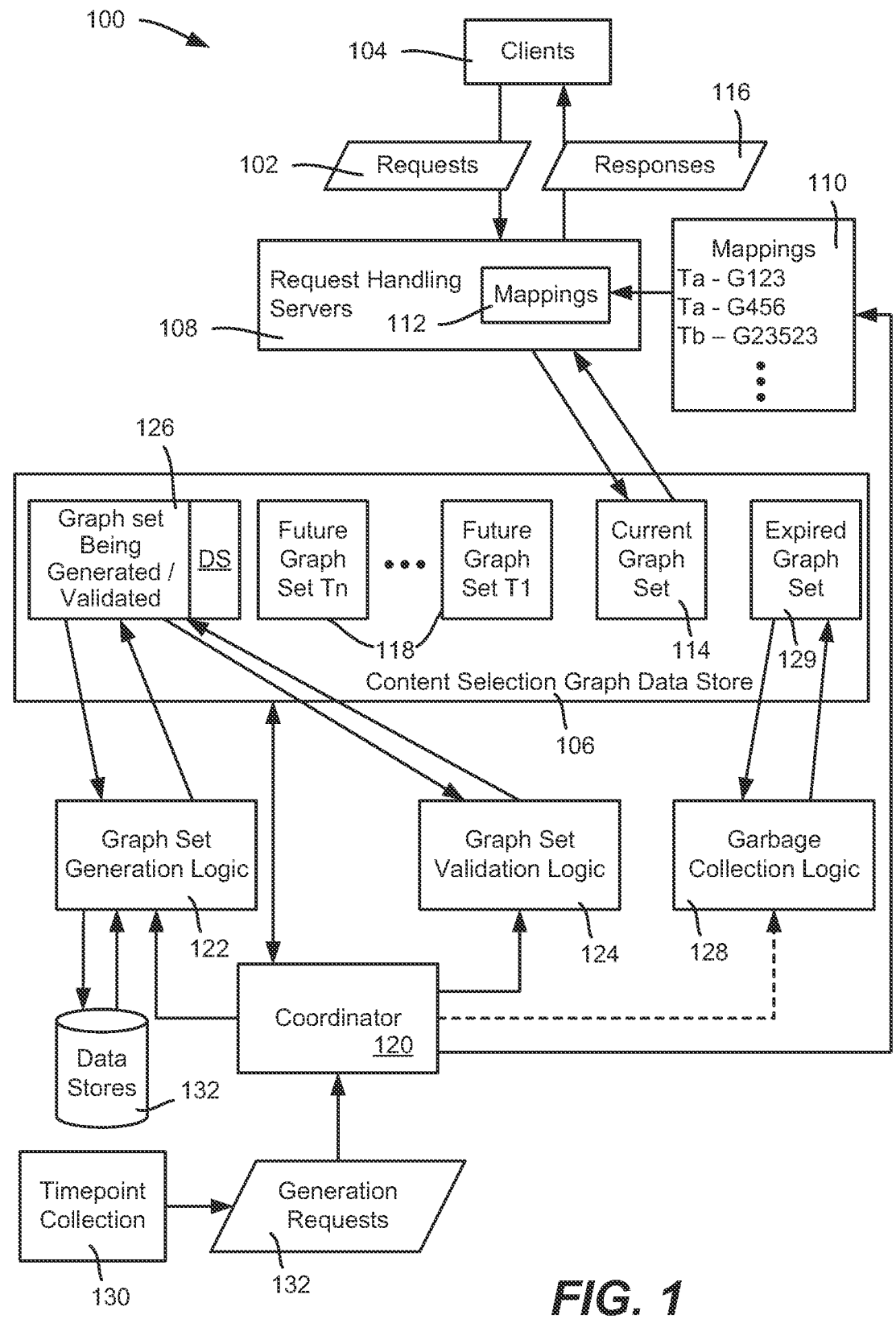
FIG. 1 is an example block diagram representation of components that return content-related information to requesting client devices, in which the information is obtained from a preloaded content selection graph data store, in accordance with various aspects and example implementations of the subject disclosure.

Various aspects described herein are generally directed towards a technology in which entire graphs that maintain the data of content selection offerings are generated, validated and stored in an in-memory data store, such as a Redis (Remote Dictionary Server) cache. Instead of having to wait for an initial request (which corresponds to one or more graph nodes), then obtain the graph data from one or more underlying data stores and build an appropriate response, the graphs including the response data for the nodes are built in advance in anticipation of a request for a graph node. Moreover, the graphs can be prearranged with preformatted and pre-shaped responses that map to the requesting client-specific information/details, e.g., a device's type, software type (e.g., a device's browser or a more dedicated device application) and version, and other factors (e.g., brand, channel such as HBO® or Cinemax®, language, territory), so that the response is returnable from the content selection data store generally as is, without having to format/shape the data. For example, there can be multiple graphs in use, one graph for device type A, software version 3.0, another for device type C, software version 2.0 and so on. The request is mapped to the correct graph based on these client-specific details (data response formatting factors), e.g., for the device type, software version, etc., whereby the response data corresponding to the requested graph node can be rapidly retrieved and returned generally as is.

Still further, because any content offering's availability can be limited in time, (that is, an offering can expire), and new content offerings can be made available from time-to-time, the stored set of graphs are associated with a starting time. When the current time reaches the starting time of a new set of graphs, those graphs, which are prepopulated into the in-memory content selection data store, become active. As a result, the correct current content selection data becomes directly available at the appropriate time for requests received at or after that time, until a next set of graphs becomes active at a next starting time.

It should be understood that any of the examples herein are non-limiting. For instance, instead of different graphs for different types of device, software versions, locales, etc.), as an alternative, a lesser number of graphs can be used, with some (ideally fast) amount of reformatting/reshaping of the response data before returning to the client. While not as efficient when responding to requests, less rapid (e.g., Redis cache) storage needs to be used. As another alternative, a device itself can be configured with some reformatting intelligence, e.g., e.g., a tablet or smartphone with a relatively small screen can adjust more generalized data (such as menus and tiles) differently than a large ("ten-foot viewing distance") television display, and vice-versa. Still further, data stores (e.g., key-value stores) other than a Redis cache can be used for storing the graph content, although the use of a Redis cache provides a number of features, benefits and advantages that can be readily recognized as described herein.

FIG. 1 is a generalized block diagram representation of an example system 100 in which requests 102 from clients 104 are serviced from an in-memory content selection graph data store 106, e.g., a Redis cache, multiple caches, database(s) and/or the like. In general, the requests 102 are received (e.g., via a load balancer or the like) at request handling servers 108. Time-to-graph mappings 110 are maintained in the system (which can be in the Redis cache). The time-to-graph mappings 110 can be polled by each of the servers 108 (e.g., once-per minute) and locally stored in the servers 108 as current mappings instance data 112. The currently active graph set 114 in the content selection graph data store 106 is known to the request handling servers 108 based on the current time. Thus, requests 102 are handled by returning responses 116 from the current graph set 114, until the mappings 110/current mappings instance data 112 indicates a new graph set is active.

Thus, as shown in FIG. 1, when a client request 102 for an item (e.g., data corresponding to a graph node) is received, a request handling server 108 of the data service locates the data item in the currently active graph set 114, based on the mappings 112 (by selecting the most recent graph set that is before the current time) and the client-specific details (e.g., brand, channel, territory, device type and API version). The response 116 contains at least some of the graph node's data. In one or more implementations, that data is already formatted and shaped for that client's specific details within the graph, as there can be multiple graphs within a set of active graphs, e.g., with one graph in the set for each permutation of client-specific information. Note that the request handling servers 108 can have their own level one (L1) write-through caches, but the "source of truth" is the content selection graph data store 106.

It should be noted that the response 116 contains information obtained from the active graph, but is not limited to the graph node data from the graph node identified in the client request. Indeed, as set forth above, the response can be pre-built in the data store, including being formatted and shaped for the requesting client based on the client-specific details. Moreover, for example, the response can contain expanded information; e.g., the client requests information corresponding to a node A, based on providing node A's identifier, and receives information from node A as well as from a node B even though the client did not identify node B. Further, the information returned to the client can be a proper subset of the graph node data; for example, a client request can identify graph node C, but only receive part of the information in the graph node data of graph node C.

In general, the components of FIG. 1 load the in-memory content selection graph data store 106 with generated and validated future graphs 118, and then serve content from a specific mapped graph of the current graph set 114 at the appropriate time. Each graph has a unique identifier and an associated time of use (once mapped), and there can be a different graph for different specific combinations of client-specific information/details/data response formatting factors, facilitating very efficient data retrieval.

As will be understood, various components are managed by a coordinator 120 to perform graph-related tasks. Such tasks include generating and writing new graphs, as performed by graph pre-cache generation logic 122, and validating graphs before use, as performed by graph pre-cache validation logic 124. Block 126 represents a graph set being generated/validated, along with one or more data structures DS used during generation and validation operations. A maintenance-type task set is performed by garbage collection logic 128, which removes expired graph sets (e.g., 129) as well as various data structures and the like, including those used during the generation and validation operations.

Thus, FIG. 1 shows how graph sets are able to be prepared in advance to quickly respond from a content selection graph data store 106 to any client request 102 for the data of a user interface graph node (item) that may come in. The technology described herein stores (pre-caches) entire sets of current and future graphs for a number of relevant points in time based on timepoints, as collected by a timepoint collection component 130 that via the coordinator 120 causes graph generation requests 132 to be made. The data for the responses 116, obtained from one or more backing data stores 134, can be customized/prebuilt in the format expected by the various types of requesting clients, including based on client-specific details.

When the current time reaches the next (future) mapped graph set, the next graph set becomes the current graph set from which responses are served. In the event that a future mapped graph needs to be changed, the mapping is updated once the modified graph is built and validated, whereby the newly generated and validated graph set is basically "hot-swapped" with the old graph set. In case of a catastrophic event, whereby the next graph set is not ready before it is needed, there is no mapping entry for it, and thus the request handling server continues to respond with data from the (now stale) cache, which is deemed significantly better than returning errors/no data.

In this way, responses to client requests are served from a current set (the most recent timepoint in the past), until a next mapped timepoint is reached by the current time, which switches request handling to a next-mapped graph. The technology maintains graph ID—timepoint mappings so that any one graph set is currently in use, until the next timepoint is reached.

Moreover, via the validation logic 124, the technology is safe so that clients get valid data. Still further, because the mappings 110 are only updated when a new graph set is ready (successfully generated and validated), clients receive a reasonable response (e.g., stale data) from the most recently valid mapping, even if a catastrophic event occurs that prevents a "future" graph from being generated in time (before it is needed). As also will be understood, the technology is adaptable as changes to graphs/nodes' data are made at any time, e.g., by editors.

Figure 2:
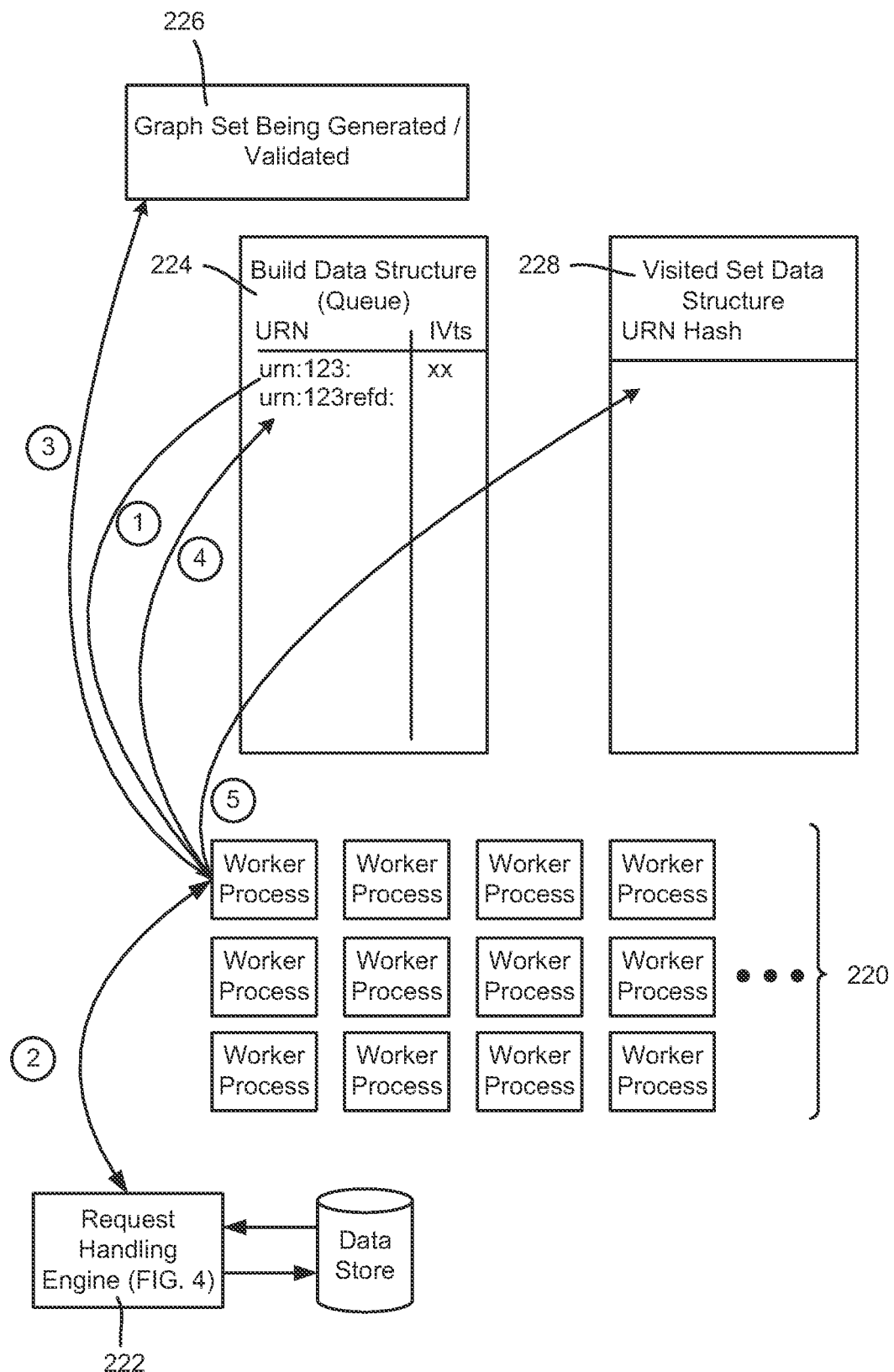
FIG. 2 is an example block diagram representation of components that can be used to generate a content graph in the content selection graph data store, in accordance with various aspects and example implementations of the subject disclosure.
Figure 3:
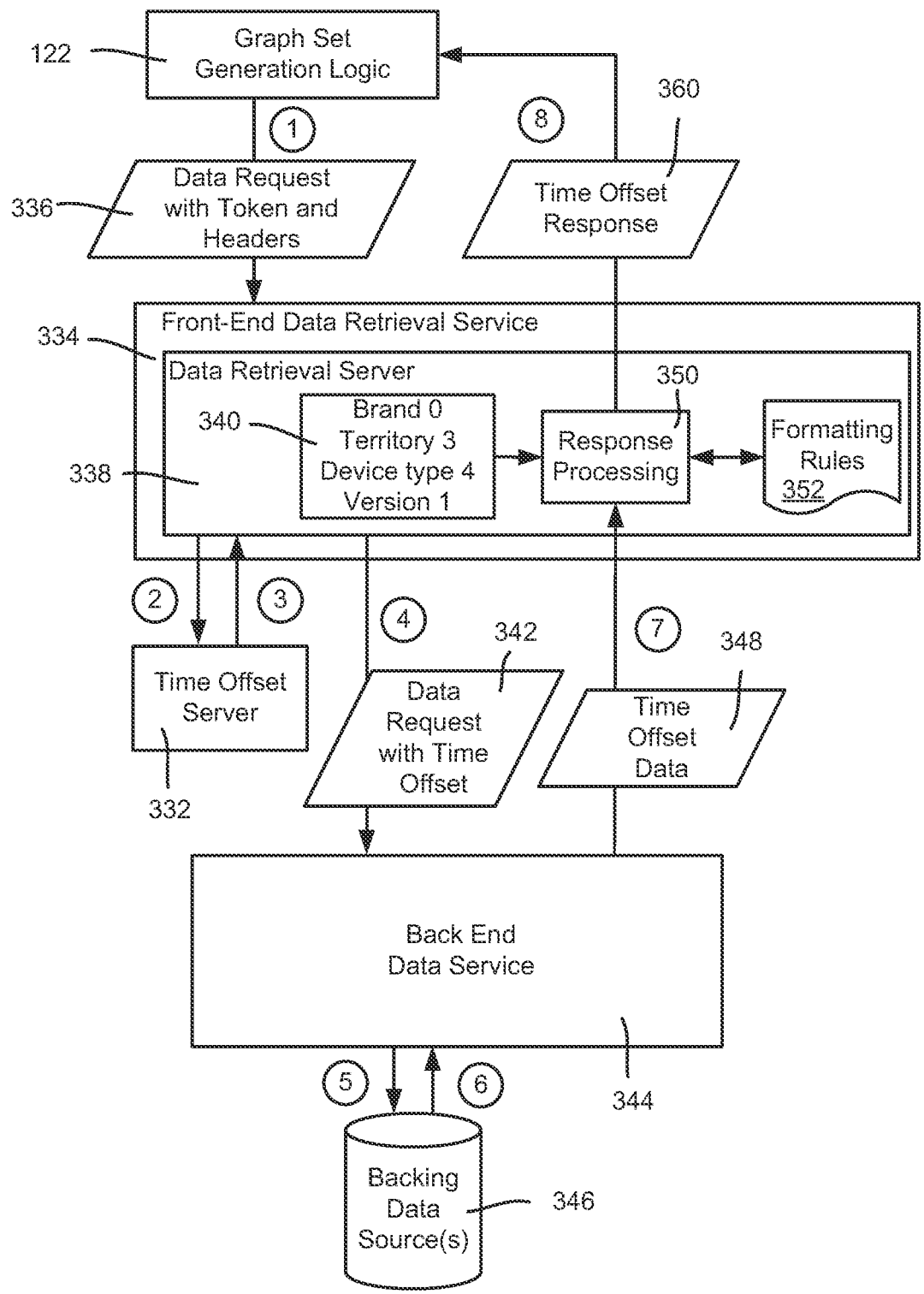
FIG. 3 is an example block diagram representation of components that can be used to obtain the content needed to generate a content graph in the content selection graph data store, in accordance with various aspects and example implementations of the subject disclosure.
Figure 4:
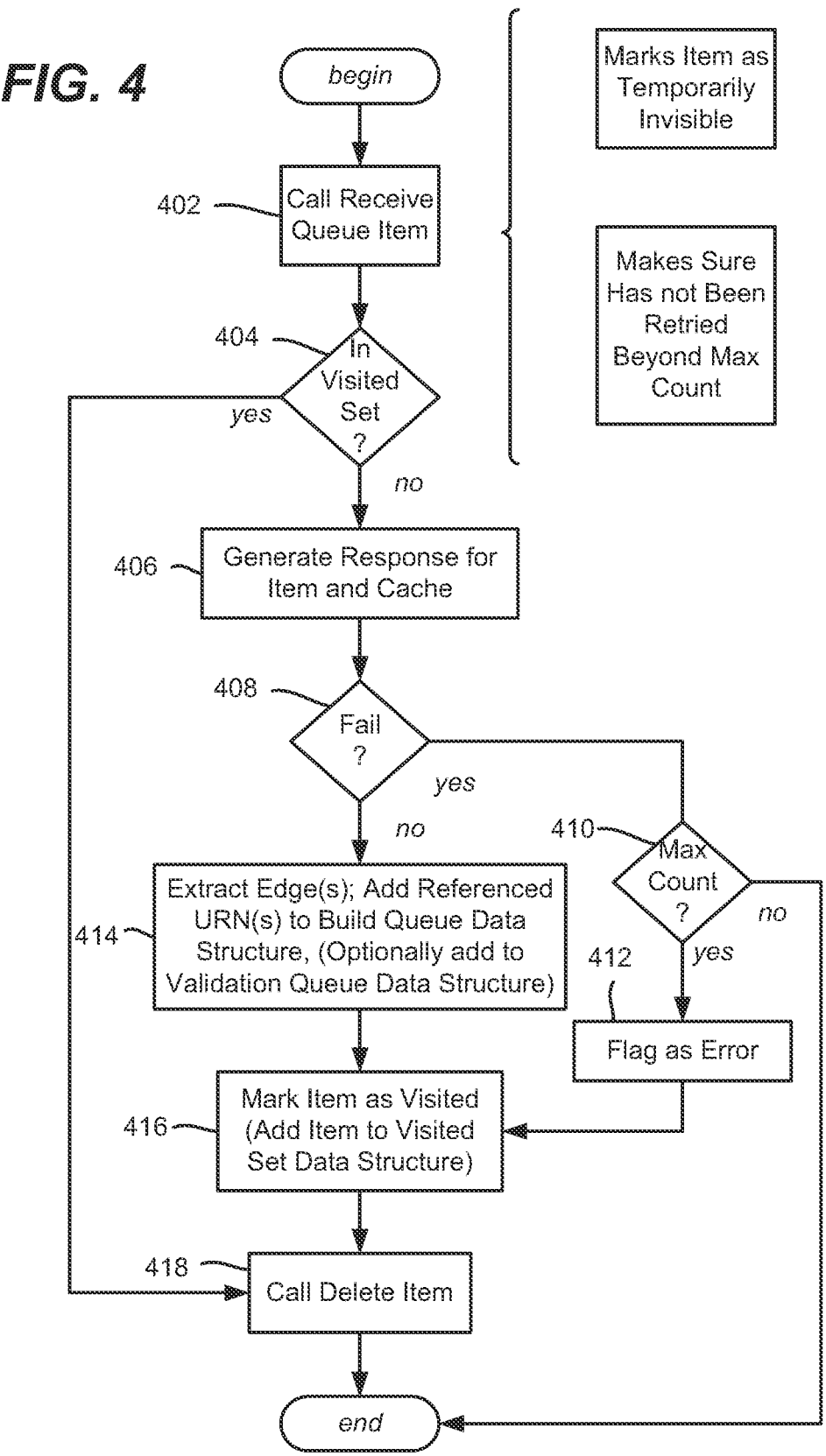
FIG. 4 is a flow diagram of example operations that may be performed by content graph generation logic to generate a content graph in the content selection graph data store, in accordance with various aspects and example implementations of the subject disclosure.

Turning to aspects related to how a graph is generated, the technology described herein stores (pre-caches) entire sets of current and future graphs for a number of relevant points in time based on timepoints, as collected by the timepoint collection component 130, which cause graph generation requests 134. Described with reference to FIGS. 2-4 is the generating and storage in the content selection graph data store 106 (e.g., a Redis cache in one or more implementations) of user interface-related data that is arranged as graph nodes, to allow rapid retrieval for client requests. As described herein, a set of graphs are built in advance for one or more future timepoints, with different data formatting factors for the graphs in the set. Once built, the set is validated, and if validation passes, the set is mapped into a set of mappings, meaning that the client request handling data service knows of the graph set's existence and will serve items from the graph set once the associated timepoint is reached.

In one or more implementations, to generate a time-based graph, the graph set generation logic 122 uses parallel worker processes 220 (FIG. 2) to load the content selection graph data store 106 with node identifiers and their data. To build the responses, the graph set generation logic 122 incorporates or is coupled to a request handling/data formatting engine 222 based on a technology that was previously performed on-demand in the request handling (front-end) servers and back-end servers, such as described in U.S. published patent application nos. 2017-0103553 entitled "GRAPH FOR DATA INTERACTION" and 2018-0322176 entitled "DATA DELIVERY ARCHITECTURE FOR TRANSFORMING CLIENT RESPONSE DATA," hereby incorporated by reference herein in their entireties.

As represented in FIG. 2, when a graph is to be built, the root node ID of the graph to be built (e.g., a URN) is placed in a build data structure 224 (e.g., a build queue, such as allocated within the Redis cache) by the coordinator 120. A worker process of the available parallel worker processes 220 is triggered to operate on an item in the build queue. In general and as shown in FIG. 2, each node ID is basically retrieved and marked as dequeued from the build queue (arrow 1), and its data retrieved and formatted (from/by the request handling engine 222, arrow 2) and then put into the graph set being generated/validated 226 in conjunction with the node ID (arrow 3). The other node(s) that it references (via one or more edge(s), if any), are also added to the build data structure 224 (arrow 4) for a next worker process to handle, and then the node is marked as handled; e.g., a hash of its ID is entered into a visited set data structure 228 (arrow 5) representing the set of node identifiers that have already been handled.

So that two worker processes do not work on the same node ID, the worker process that handles a node ID marks a queued data structure entry (representing a node) as invisible, e.g., via invisibility timeout data (IVts) maintained in the data structure. The worker process extracts the edge (s), referenced in node data, to determine other node(s) that need to be handled, and if any exist, adds them to the build data structure 224. However, to avoid redundant work, before adding a new node referenced via an edge to the build data structure 224, the worker process evaluates which other nodes have already been handled/added to the graph (via the visited set data structure 228). Error handling is also performed as described herein. Note that the graph pre-cache generation logic can load a validation queue 550 (FIG. 5) for validating generated nodes.

With respect to obtaining the data, FIG. 3 is a block diagram showing the graph set generation logic 122, which has time offset ("time-travel") capabilities, such as described in U.S. published patent application no. 2017-0324986 and entitled "TIME OFFSET DATA REQUEST HANDLING," hereby incorporated by reference herein in its entirety. A time-travel value may be an adjusted time value relative to the current time (e.g., corresponding to the difference between a timepoint and the current time) or an actual time in the future (corresponding to the timepoint) for which time offset data exists and is retrievable. A time offset server 332 may limit the time offset values to only values for which time offset data exists and is retrievable.

As described herein, a front end data retrieval service 334 can reformat general data based upon the device in use (as well as the software version of the program running on the device that displays the data). In this way, for example, some future set of data may be formatted to appear one way on a tablet device's display, and another way when appearing on a gaming and entertainment console's display. This means graphs can be generated with future data for each device type, for example.

To this end, the graph set generation logic 122 sends a request 336 for data, with a token that contains the desired future time and (e.g., simulated) information e.g., representing device type, brand, channel and territory data. Headers accompanying the request can indicate version and language information. This is represented in FIG. 3 via the arrow labeled one (1). The token is received during user authentication, as generally described herein; note however that this is only one implementation, and, for example, the data retrieval service alternatively can be pre-configured to map a graph type identifier (ID) to the client-specific/formatting details, so as to only need receive {desired time, graph type ID} from the graph set generation logic.

When the front-end data retrieval service 102 receives the request, e.g., as handled by a data retrieval server 338 (of possibly more than one), the server 338 recognizes from information in the token that the graph set generation logic 122 has time-travel privileges and has client-specific data 340. The server 338 thus communicates with the time offset server 332 to obtain the time-travel value that the graph set generation logic 122 has set for time offset data. This is represented in FIG. 3 via the arrows labeled two (2) and three (3).

Because caches are not used with a user's time-travel data (as doing so would use non-time travel data as well as cache undesired time offset data, such as from a previously generated graph set), a request 342 is sent with the time offset value to a back-end data service 342 (the arrow labeled four (4)).

The back-end data service 344 requests the needed data, at the desired time offset, from the one or more data sources 346, and receives the requested data item or data items. This is represented in FIG. 3 via the arrows labeled five (5) and six (6). Thereafter, the back-end data service 112 composes the time offset data 348 and returns the 348 to the data retrieval server 338 (arrow seven (7)).

In one or more implementations, the time offset data 348 is independent of the client-specific details supplied by the graph set generation logic 122. As a result, the data retrieval server 338 includes response processing logic 350 that formats the data for the particular (simulated) client-specific details, e.g., based on formatting rules 352. The result is a formatted, time offset response 360 returned to the graph set generation logic 122, arrow eight (8), such as described in such as described in U.S. published patent application nos. 2017-0104842 entitled "TEMPLATING DATA SERVICE RESPONSES" and 2017-0177333 entitled "MAINTAINING AND UPDATING SOFTWARE VERSIONS VIA HIERARCHY" hereby incorporated by reference herein in their entireties. Note that alternative implementations can return data that is already formatted from a back-end service, and thus may not need such device-specific processing, at least not to a full extent.

It should be noted that for efficiency, the same data entity is not saved more than once in the content selection graph data store 106. Instead, the key to locate the content is first based on the graph identifier, and then based on a hash-based entity pointer to a single instance of the data blob in the content selection graph data store 106. Consider, for example, that the content selection graph data store 106 is first arranged by type ("graph") and ID (the unique graph identifier) of the key. The value of the key can be a "hashes" (a secondary key) along with an entity identifier as the secondary key's value, comprising the hash of an entity data blob (e.g., a serialized JSON data blob). Thus, once retrieved, the hash value serves as a pointer to the single data instance/entity from which the Redis cache returns the correct data blob.

Note that locating the correct data is thus a two—level lookup, (get the correct graph, then get the pointer in that graph), but can be accomplished by a single call to Redis that invokes a LUA script, e.g., using HmGet, mGet commands). Note that multiple data blobs are typically requested by a client in a single request, and thus mGet (multiple Get)/HmGet (hash multiple Get) are used in one or more implementations.

FIG. 4 summarizes example operations of the graph set generation logic 122, including operation 402 in which a worker process that is seeking a node (item) to process makes a request queue item call, and if an item is available, gets back an item to process. The call also causes the item to be set with an invisibility timeout (e.g., 30 seconds) and also increments a retry count.

The processing by the worker process includes checking (operation 404) whether the node has already been handled (visited), which is possible because a node may be referenced by more than one other node (via an edge), including by a node it references. If already handled, the worker process branches ahead to operation 418 to make a delete queue item call.

If not previously visited, a response is generated for that item at operation 406 (by calling the request handling engine 222, FIG. 2), and the response is now obtained for storage. If the response generation failed (as evaluated at operation 408), the worker process ends, leaving the item in the build data structure 224 to be handled again (once it becomes visible after the invisibility timeout is reached), up to the maximum amount of retries allowed. The maximum retry count prevents bad/missing node data from causing the generation process to run basically forever. Note that if the maximum retry count is reached (operation 410), the item can be marked as having been visited and deleted; also the error can be flagged (operation 412) so someone such as an editor can investigate why the item was unable to be put into the graph.

If the response is generated and cached, any other node(s) referenced by the node being processed are added to the build queue, as represented by operation 414. The item is marked as visited (operation 416), and then a delete queue item call is made at operation 418.

Note that an item is not actually dequeued when retrieved, because 1) the worker process may fail and 2) the queue is not considered empty when at least one item is still being processed. Instead, the item is marked as invisible with respect to "receive queue item" retrieval for some timeout time, such as 30 seconds. If the worker process fails, the item is allowed to be retrieved for processing again, after the timeout time. Thus, the retrieve queue item call/delete queue item call is generally transactional in nature.

Figure 5:
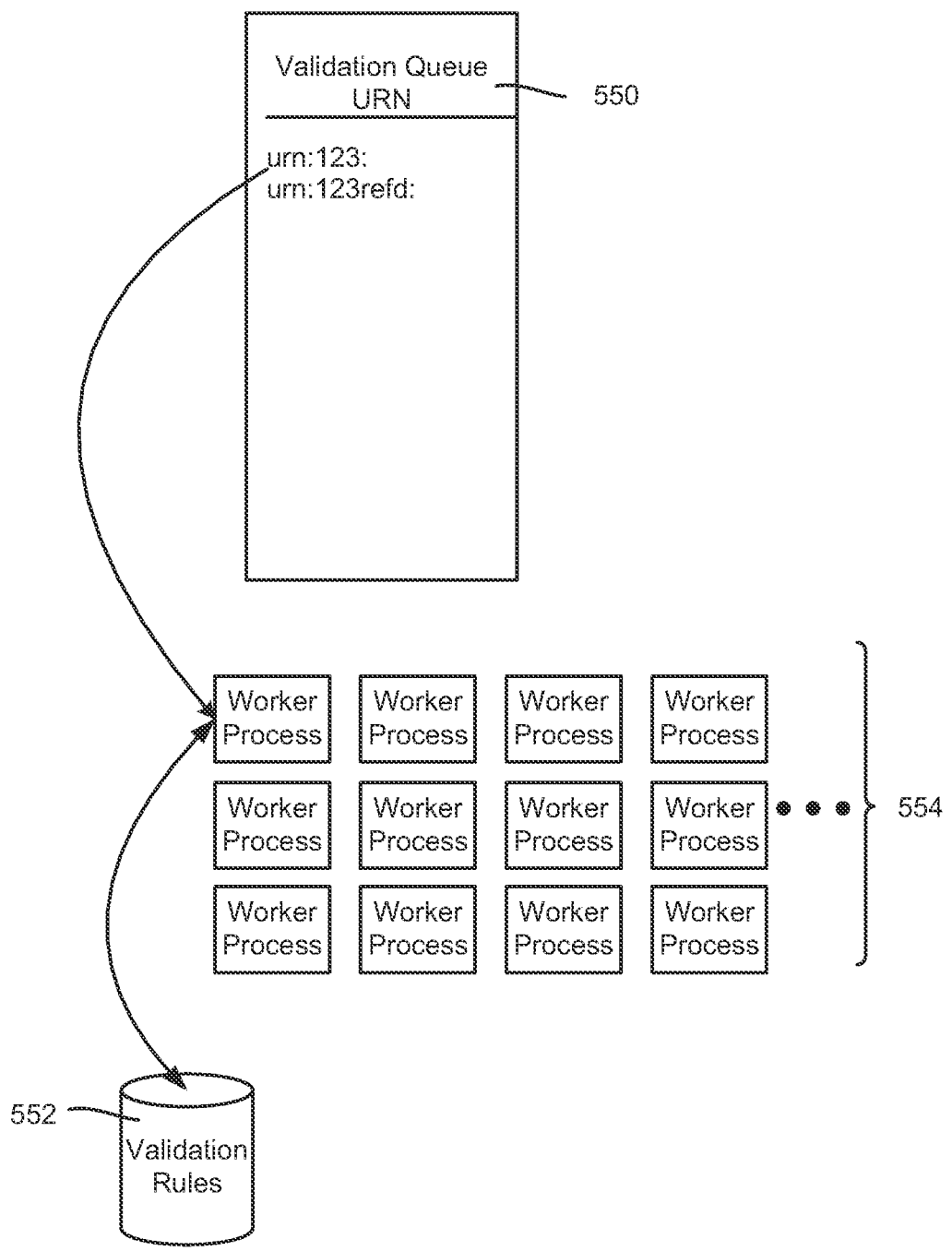
FIG. 5 is an example block diagram representation of components that can be used to validate a content graph before use in a content selection graph data store, in accordance with various aspects and example implementations of the subject disclosure.

Turning to FIG. 5 and validation, that is, the processes and logic that validate each time-based graph following generation, once generated but before mapped for use, a graph needs to be validated to make sure it has no significant errors. To this end, validation logic dequeues each item from a validation queue 550, locates and applies validation rules 552 specific to that item/item type, and records any errors or warnings associated with that item. Worker processes 554, e.g., provided/triggered by the coordinator 120 and/or generation logic 122 (FIG. 1), perform the validation. An alternative implementation may use the worker processes to crawl each graph to validate each node, e.g., instead of using a validation queue.

Thus, in general, validation refers to validating user interface-related data that is arranged as a graph of nodes, to ensure cached data has no significant errors. Validation ensures that valid data is served to clients from a cache for any client request for a user interface graph node (item) that may come in, including for each client-specific detail (e.g., device type, version, etc.).

To this end, before allowing a graph to be used, each node is validated against validation rules 552. In one or more implementations, following successful generation, each item (node ID) in a validation queue is processed; the item ID may be written as part of generation, or copied from the visited queue (e.g., minus failed nodes), and so on. An alternative implementation is to walk each node in the graph.

Figure 6:
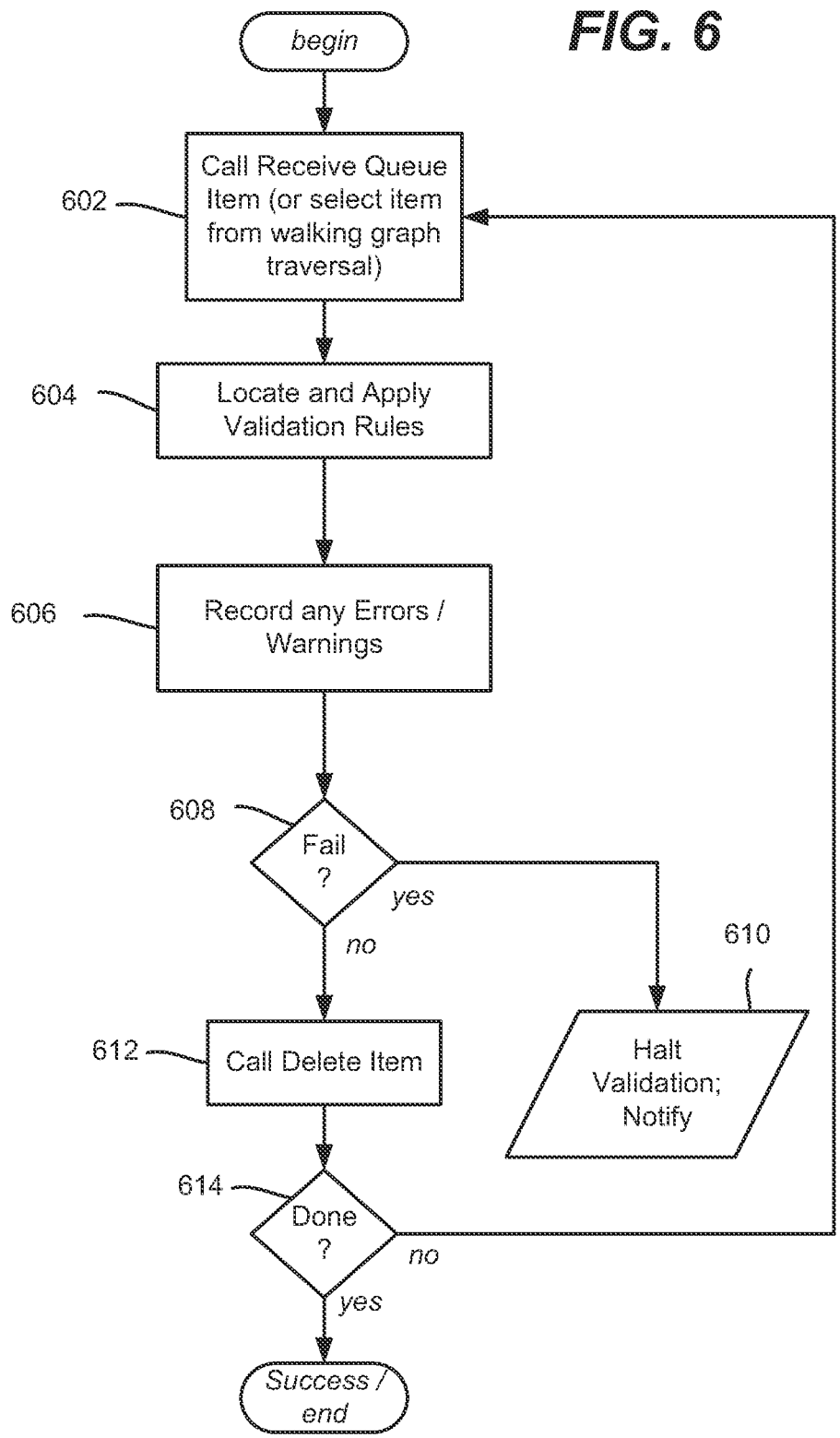
FIG. 6 is a flow diagram of example operations that may be performed by content graph validation logic to validate a content graph in the content selection graph data store, in accordance with various aspects and example implementations of the subject disclosure.

As generally shown in FIGS. 5 and 6, regardless of how a node/item is obtained at operation 602 (by calling receive queue item or by walking the graph), validation is based on a worker process evaluating the node data (e.g., the returned response data) against a set of rules that is relevant to that node (operation 604). Note that the same general concepts for generation can be used for validation, e.g., invisibility for a time upon calling to receive a queued item, marking a node as visited (e.g., if traversing the graph) and so forth to avoid inefficient reprocessing.

With respect to selective rules, for example, for a "menu" type node, a rule may specify, for example, that the menu contain at least one item, and that there are no duplicate nodes (with the same URN) listed in the menu. For a "feature" type node (representing a piece of content such as a movie or television program that can be streamed), a rule may specify that the feature contain a title that is not an empty string, for example. A "series" type node may evaluate whether all listed seasons actually exist, and so on. Rules may be specific to brand, channel, territory, device type and API version; for example, a rule for API version X may look for a node attribute that is present in API version X, whereas the attribute may not exist in API version Y, and thus no such rule is applicable.

If upon evaluation against the validation rules for the node type there is no violation (operation 606), the validation process branches ahead to operation 614 to delete that item from the validation data structure (or otherwise mark the node as having been handled), and, for example, adding the node identifier to a visited set data structure. Operation 616 repeats the process with a different node item until the validation data structure is empty or the entire graph has been traversed.

Where there is a violation at operation 606, some action is taken at operation 608. Note that some rule violations may be considered errors and recorded as such, while other violations may be recorded as warnings.

In addition to (or instead of) errors and warnings, a graph may be scored, for example, by having different kinds of violations have different weights. The score can be accumulated for a given graph.

A violation that is considered significant enough to fail the validation process may halt the validation process (operations 610 and 612) and notify a responsible person or team. For example, if the root (home) menu has no referenced items, the entire graph is not functional. Other errors may be too significant to consider the graph to be reasonably useable. Further, a validation score for a graph may reach an accumulated threshold value that fails the graph and halts further validation. Otherwise, at operation 614 the item is deleted (or otherwise marked as having been handled), and validation continues (operation 616) until the graph is successfully validated (or fails). Note that even if a graph is successfully validated, a responsible person or team may look into any warnings or errors that were logged.

Turning to coordination of generation and validation, the coordinator 120 coordinates the series of processes and the logic that first builds and then validates the graphs. An input message (e.g., corresponding to a new timepoint) triggers a graph generation request, and the request can be expanded to include any non-specified parameters. Based on the request, the coordinator 120 generates the graph IDs, creates the various build and validation queues, triggers the building operations, determines graph completion, triggers the validation operations of each completed graph and maps the graphs that successfully validate.

The coordinator 120 thus coordinates how entire sets of current and future graphs may be cached (built, validated and mapped) for a number of relevant points in time (timepoints). A set of graphs are built in advance for a future timepoint. There can be a different graph in the set for each permutation of client-specific details (e.g., brand, channel, territory, device type and API version). Once built, the set is validated, and if validation passes, the set is mapped into a set of mappings, meaning that the client request handling data service knows of the set's existence and will serve items from the set once the timepoint is reached. The coordinator can also remove a mapping, e.g., if the new graph set is intended to replace another graph set that was previously built, with the other graph set now considered an "orphaned" graph set.

Figure 7:
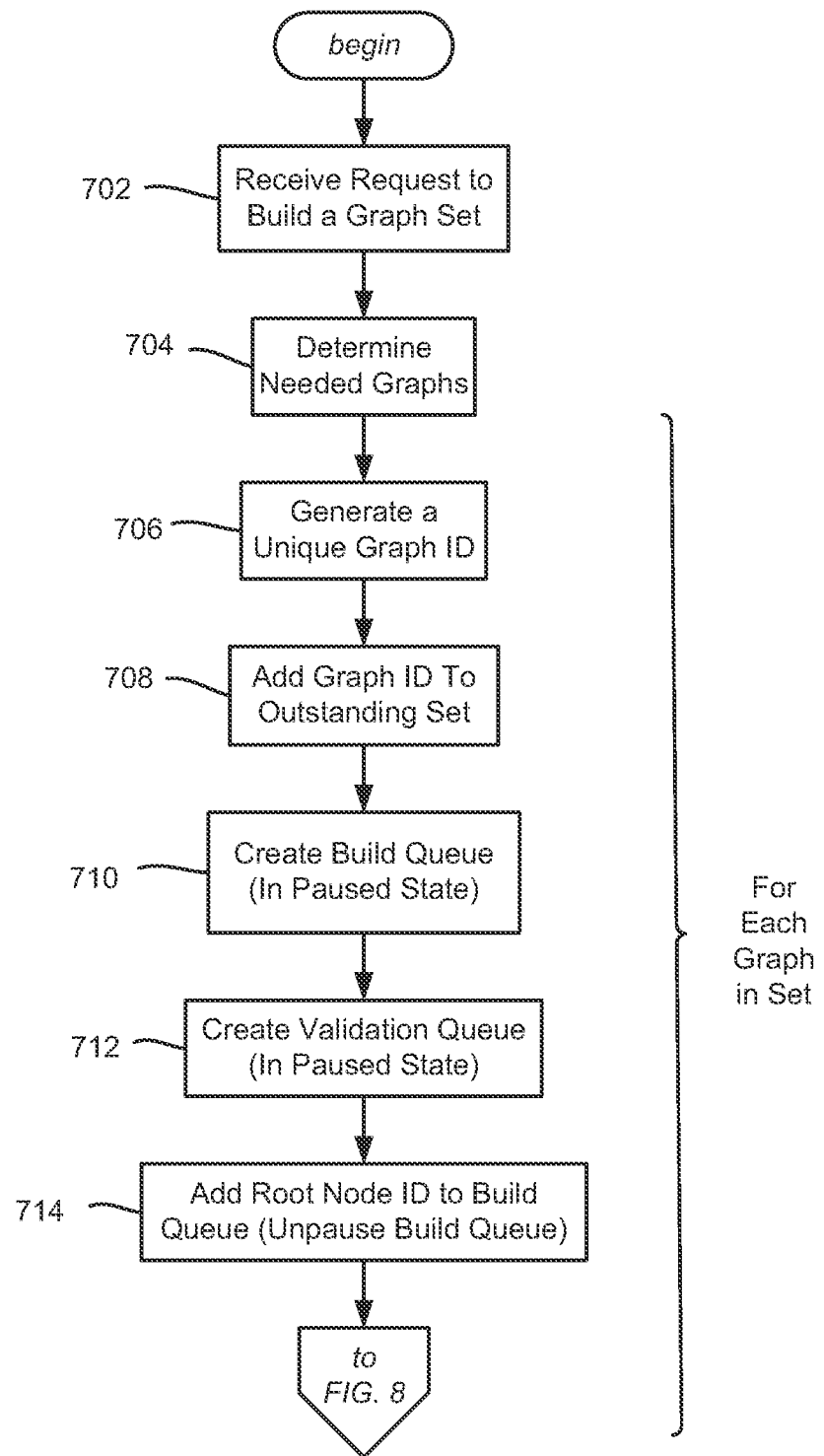
FIGS. 7 and 8 comprise a flow diagram of example operations that may be performed to coordinate the generation and validation of content graphs in the content selection graph data store, in accordance with various aspects and example implementations of the subject disclosure.
Figure 8:
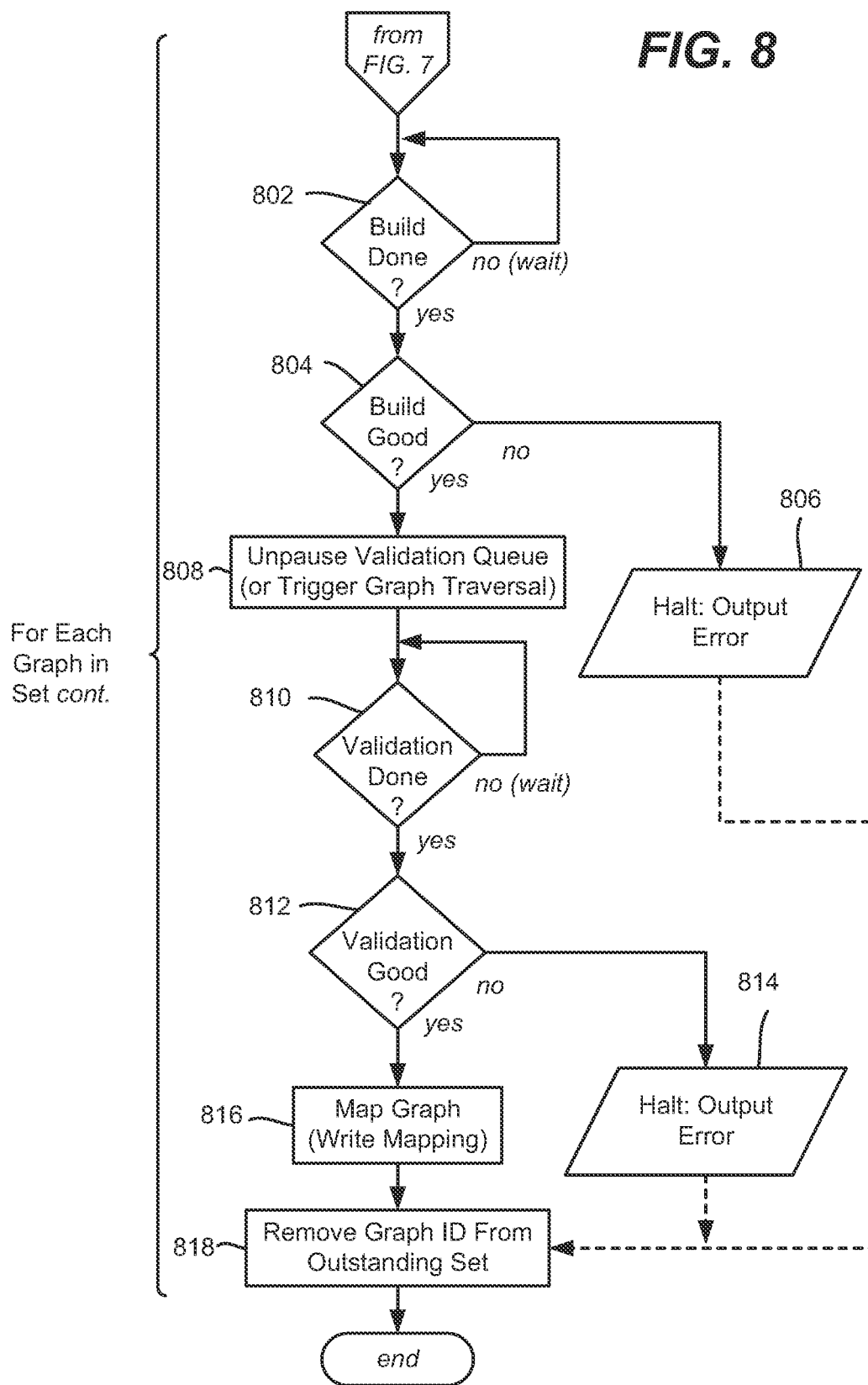

As shown in FIG. 1 and FIGS. 7 and 8, coordination is needed to manage the various processes that build and validate each graph, and then map the graph set if successful. Coordination starts upon receiving a request to build a graph set (operation 702). The request may be expanded for any non-specified parameters at operation 704; e.g., if a device type is not specified in the request, then a graph is generated for each supported device type. In one or more implementations, there may be many dimensions for expansion by the coordinator, as timepoint, along with brand, channel, territory, device type and API version are parameters that may be specified or left unspecified with any request. This can, for example be done in various ways. For example, a graph set can have a generally common identifier (e.g., sequentially chosen so as to ensure uniqueness within the system) associated with a timepoint, with brand, channel, territory, device type and API version parameters being represented by a value appended to the generally common identifier for that graph set. A request for a graph node in a graph finds the active graph set, and then uses the client-specific information to determine which graph in the active graph set applies to the given request. Alternatively, the mapping can have a system-unique identifier for each timepoint and client-specific permutation that is not necessarily related to other active graphs; a request maps to one graph identifier for the particular timepoint/brand/channel/territory/device type/API version permutation.

For each graph in the graph set, the coordinator 120 generates a unique graph ID at operation 706, adds the graph ID to an outstanding set (operation 708) creates a build data structure 224 (FIG. 2) such as the build queue (in a paused state, operation 710), and creates a validation data structure 550 (FIG. 5) such as the validation queue (in a paused state, operation 712). The coordinator 120 triggers the building process at operation 714 by adding the root node to the build queue (which un-pauses the build queue) causing the generation component to begin building the graph as described herein. Note that a graph can be identified by brand/channel/territory/device/API version/timepoint, which is mapped to a unique graph ID. To hot swap a graph with a replacement graph, the brand/channel/territory/device/API version/timepoint can be mapped to a different graph ID.

The coordinator 120 then evaluates for completion of the build for that graph, as represented by operation 802 of FIG. 8; e.g., polls a generation status flag (set when generation starts) that the generation component worker process clears when the build queue is empty (no worker has added any other node ID)). If the build was successful as evaluated at operation 804, the coordinator triggers validation; otherwise the process is halted at operation 806. For example, if the build was successful the coordinator may un-pause the validation queue at operation 808 to evaluate for completion of validation.

In an alternative to validation based on a validation data structure (e.g., a validation queue), the coordinator can trigger a graph traversal. As described herein, via a graph traversal each relevant node can be selected, an associated rule set obtained for that node (e.g., based on node type and client-specific information), with the response data for that node evaluated against the selected rule set.

The system can poll a validation status flag (generally similar to that of the build status flag) to determine when validation is complete. If validation is successful (operation 812), the coordinator 120 (or another component of the system 100) maps the graph by writing the mapping to the data service client handler's mapping set (operation 816), and removes the graph ID from the outstanding set (operation 818). Otherwise the process is halted (operation 814), without ever having written the mapping. Note that operations 806 and 814 remove the graph ID from the outstanding set, which means that the graph and associated data structures, etc., will be removed from storage during garbage collection, as described herein.

Note that the coordinator may batch requests received over a period of time, so that, for example, a small change does not immediately trigger graph generation, in case a number of such changes are being made at generally the same time. The coordinator also may replace graphs in the cache by swapping one mapping for another when those graphs have the same time point, to allow for changing the graph once a change is needed.

The coordinator also may trigger garbage collection, although this may be a time-based process that runs periodically for example, or runs whenever a new timepoint is reached.

Figure 9:
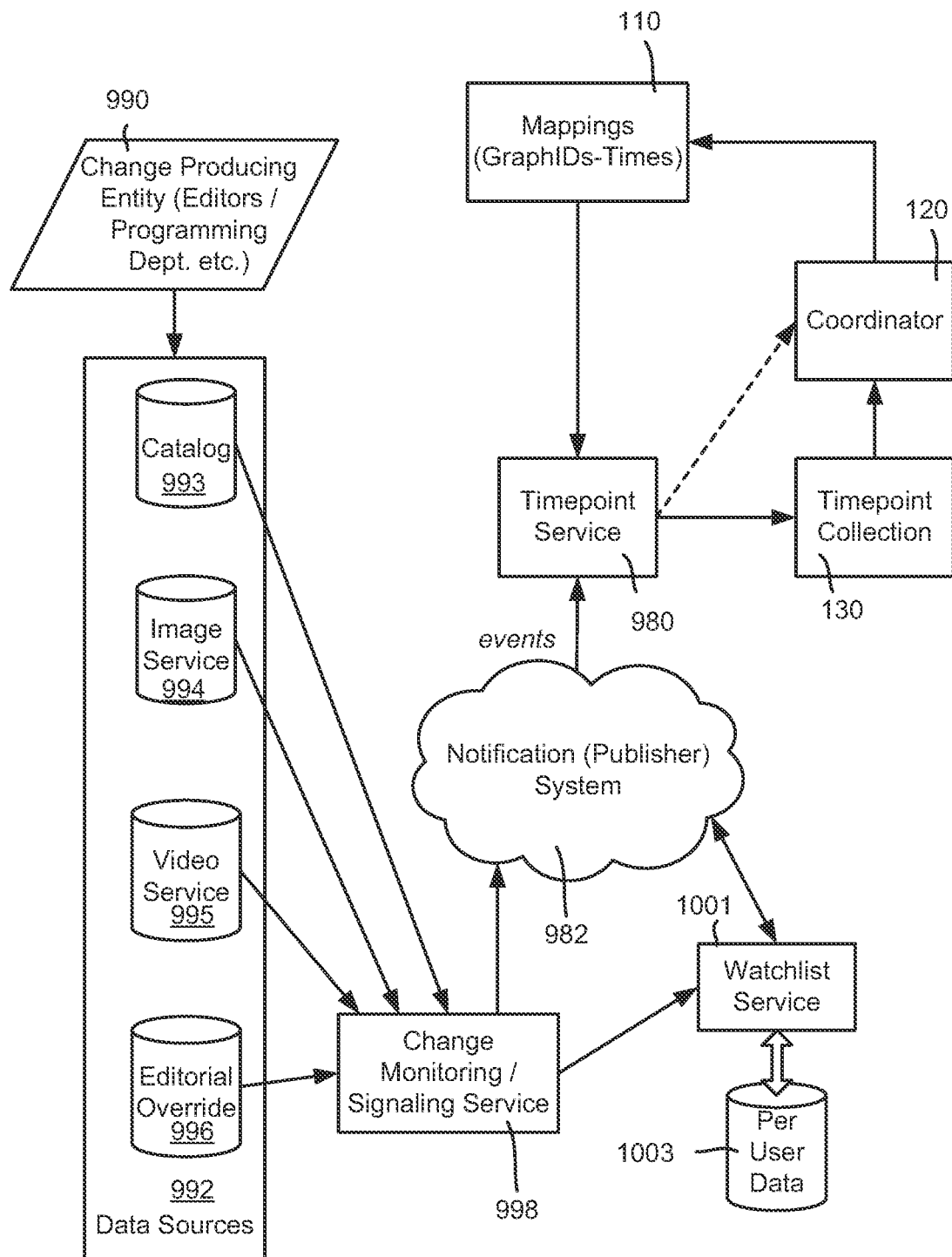
FIG. 9 is an example block diagram representation of using timepoints (e.g., start times, end times and/or commencement times) to generate graphs of content offerings in the content selection graph data store, in accordance with various aspects and example implementations of the subject disclosure.

Turning to another aspect, FIG. 9 represents the concept of collecting timepoints (e.g., start times, end times and/or commencement times, such as in Coordinated Universal Time) used for generating the graphs of the available streaming content offerings. In one or more aspects, the technology detects changes made to content/the programming schedule/a graph node, to insert a new timepoint into the set of timepoints to trigger automatic graph generation.

More particularly, the user interface data for selecting content, arranged as a graph, regularly changes as new offerings become available and other offerings expire. Each new timepoint corresponds to a different set of graphs. In addition to new offerings, editors often make changes to programming schedules, such as when an unexpected event occurs, or when an error is discovered. Editors also make editorial changes, such as to use a special image in conjunction with a particular feature. When a change is made, any previously obtained graph data with respect to a changed schedule is no longer valid.

To this end, a timepoint service 980 collects the timepoints that are relevant for the sets of future graphs, and monitors for changes relevant to any (possibly) pre-generated graph. Changes can be received as events/notifications from a notification (publisher) system 982.

In this way, the timepoint service 980 monitors for changes relevant to the data in the underlying existing graphs; in one implementation this is done by subscribing for change notifications via the technology described in U.S. patent application Ser. No. 15/625,366 filed Jun. 6, 2017 and entitled "MONITORING SERVICE FOR PRE-CACHED DATA MODIFICATION" (hereby incorporated by reference herein in its entirety), which describes one suitable notification (publisher) system 982. Whenever a change occurs, an event is published and detected by the timepoint service 980, which determines the relevant timepoint or timepoints affected. The timepoint service 980/timepoint collection component 130 (which can be a single combined entity) sends a request message to the coordinator 120 for a new graph set to be generated. The timepoint service 980 (or the coordinator 120) may replace an existing graph set, or insert a new timepoint into the timepoint collection component 130 (having the timeline corresponding to the graph sets) used for generating the time-based graphs.

By way of example, as generally represented in FIG. 9, a change producing entity 990, such as editors, programming department personnel and the like, makes changes related in data sources 992 to content that is to be made available for user viewing. Example data sources include a catalog 993 of content-related items to be offered, an image service 994 that provides representative images for use in data items presented to a user for interactive selection, and a video service 995. The change producing entity 990 also may output editorial override information, and or one or more editors such as an editorial team may place information in an editorial override data store 996 that overrides any data in the catalog 993, the image service 994 and so on.

A change monitoring/signaling service 998, which can be coupled to or incorporated into the notification (publisher) system 982, detects and signals whenever a change to one of the data sources 992 is made; for example an event may be output on any database write, along with information as to what information changed. Filtering, batching, sorting, classification and so on (e.g., this database write is of type "change" and is relevant to a data item associated with the root menu having an identifier of "urn:hbo:navigation:root") may be performed so that relevant events with contextual information are propagated to downstream listeners that are interested in certain types of events.

To propagate the relevant events, the change monitoring/signaling service 998/the notification (publisher) system 982 outputs a message or other similar event notification to consuming subscriber entities, two of which are exemplified in FIG. 9 as a user-specific data caching ("watchlist") service 1001 and the timepoint service 990. Note that instead of message propagation/publication, a feasible alternative is to place the messages in a commonly accessible storage or the like for polling by interested consumer entities. As used herein, the term "change event" with respect to an entity may be used interchangeably with "message" or "notification" and covers the concept of propagated change events as well as change events obtained via polling.

As described herein, for events that affect timepoints, the timepoint service 980/timepoint collection component 130 and/or the coordinator 120 take action to invalidate (and/or replace) any data made obsolete by the change. This prevents incorrect data items from being served when they would otherwise become active at a specified time.

Another type of event, which is independent of the data sources 992, relates to events that affect user login statuses. Such events can be detected at the front end data service. For login events, the watchlist service 1001 may pre-populate the content selection graph data store 106 (FIG. 1) with information based on per-user data 1003. It should be noted that a user can get a different graph when logged in or not, e.g., particularly with respect to the per-user data 1003.

In this way, the various databases and the like that support user interface content are scanned for timepoints corresponding to future graphs. Requests to generate the future graphs are then sent to the coordinator 120, which coordinates the generation, validation and mapping of those graphs.

Turning to aspects related to garbage collection, the system 100 needs to safely reclaim space in the content selection graph data store 106 (FIG. 1), e.g., corresponding to expired graphs (e.g., expired graph set 129) that are no longer in use, as well as other associated storage space. As can be readily appreciated, the building of the set of graphs, validation of each graph and the graphs themselves can consume relatively significant amounts of memory.

To safely reclaim such memory space, at appropriate times, garbage collection logic 128 runs with a set mutex to safely delete the various data structures, and delete each expired graph once a more recent graph is mapped and is being used. The garbage collection technology described herein also locates and deletes orphaned graphs, which are those that were replaced because of a programming/graph node change.

Note that there is not simply an expired graph and related data structures to reclaim, but rather a number of cache memory consumers that need to be carefully and safely reclaimed. This can include graph mapping data, graph metadata, graph build data structures (e.g., queues, status data, etc.), graph validation data structures (e.g., queues, status data, etc.), error data, such as build errors, and so forth.

At any instant in time relative to the content selection graph data store 106, a number of current graphs are in use, future graphs may be being built or validated, there may be graph metadata, build structures, failed graphs, orphaned (successfully generated, validated and mapped but later replaced) graphs, and so on, each of which need to be left intact, or need to be fully reclaimed (or else the amount of available cache memory will decline over time). Note that in one or more implementations, the content selection graph data store 106 is not only used for the graphs, but also for the various data structures used for generating and validating graphs. In one or more alternative implementations, a separate data store can be used for the structures needed to generate the graphs.

Figure 10:
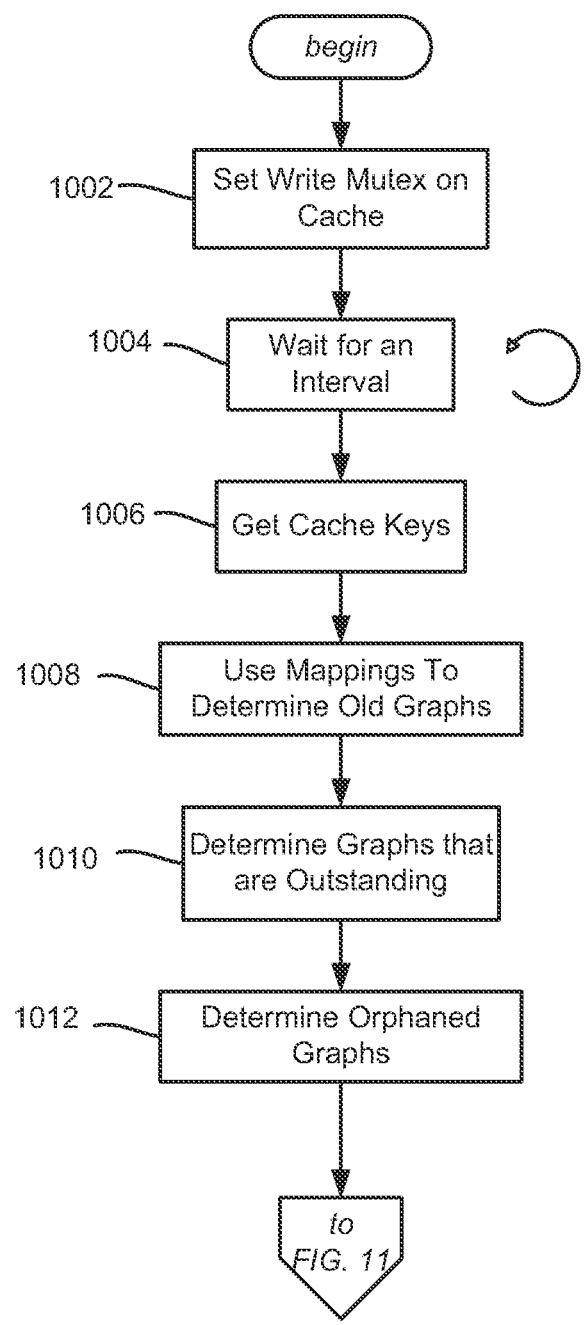
FIGS. 10 and 11 comprise a flow diagram of example operations that may be performed to garbage collect content graphs and related information from the content selection graph data store, in accordance with various aspects and example implementations of the subject disclosure.
Figure 11:
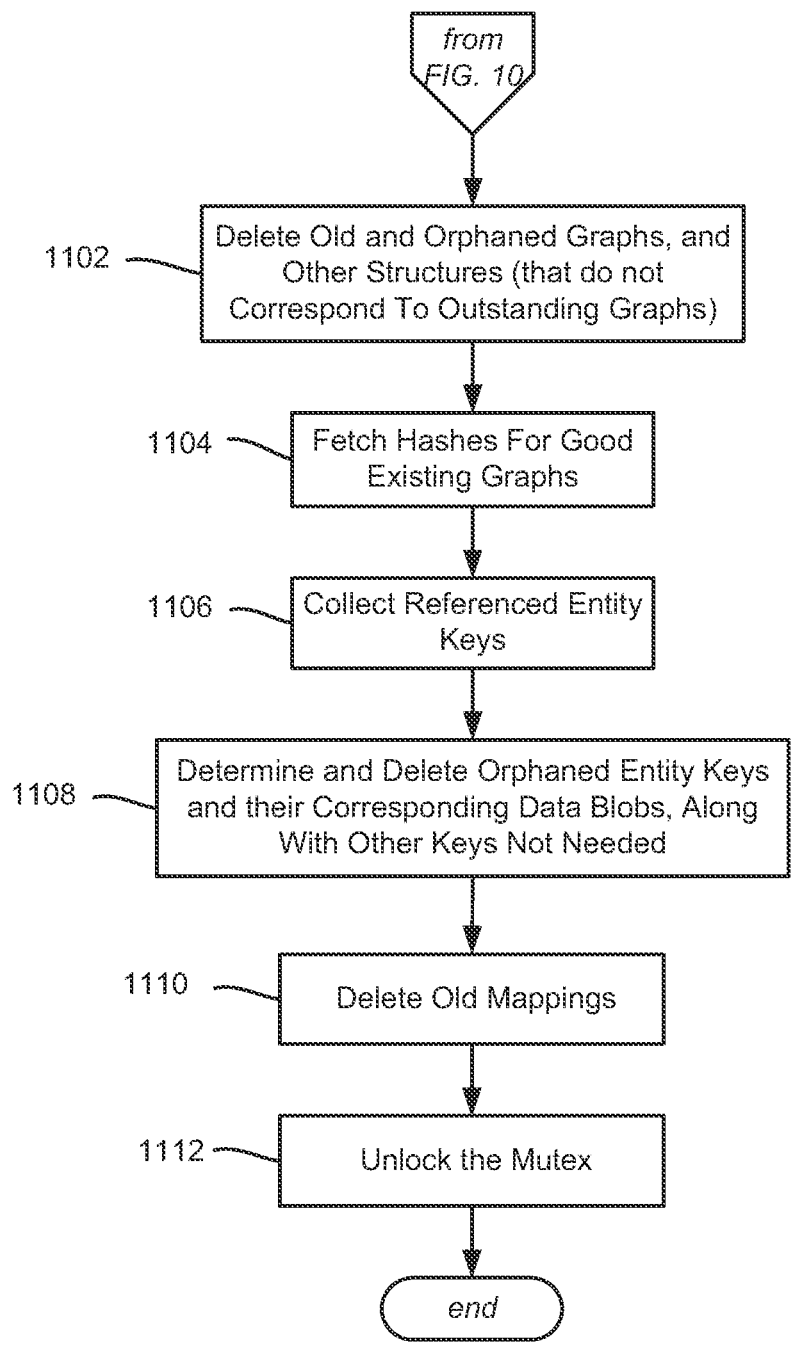

The garbage collection logic 128 designed for the content selection graph data store 106 is run, e.g., periodically and/or possibly on an event driven basis, such as when the graph set (formerly) in use in association with a timepoint becomes expired, when storage reaches a threshold capacity, and/or upon a need for new future graph generation. As shown in the FIGS. 10 and 11, garbage collection logic operates by setting a write mutex (operation 1002, e.g., via the SET command) on the content selection graph data store 106 (Redis cache) so that the coordinator 120 can finish operations and thereafter wait for the mutex to be released. Note that the Redis Scan command gets the set of keys in the cache; however if a build mutex (e.g., written by the coordinator) has the cache locked, garbage collection cannot be performed until a next iteration. Further note that the mutex is a write mutex, so that the cache can continue to serve content during garbage collection.

At operation 1004 the garbage collection logic 128 waits for an interval (e.g. longer than the generation status polling interval) for the other operations to finish, and then starts collecting garbage.

To collect the garbage, at operation 1006 the garbage collection logic 128 scans the content selection graph data store 106 to get the set of keys (e.g., namespace|graph ID|optional suffix, such as outstanding_graph_IDs) that exist in the Redis cache. With the graph IDs, the garbage collection logic 128 looks at the mappings to determine old graphs (operation 1008). Note that this corresponds to any graph that is mapped to a time before the current time, other than the set of graphs currently in use (of the mapped times; the graph set in use has the greatest time less than or equal to the current time).

The garbage collection logic 128 also determines the graphs that are outstanding (yet to be fully built and/or validated), so that these are not cleaned up. Such graphs are determined based on the keys, e.g., identified as outstanding graph IDs via their cache keys (operation 1010).

To determine orphaned graphs (operation 1012), the garbage collector looks for graphs that are not mapped and are not outstanding graphs, e.g., the graph that was replaced; (note that failed graphs are removed from the outstanding set so that they will be garbage collected). Once determined, as represented by operation 1102 of FIG. 11, the garbage collection logic 128 deletes the old and orphaned graphs, and other structures that do not correspond to outstanding graphs. Note that this also deletes hashed entity pointers associated with that graph.

As represented by operation 1102, the garbage collection logic 128 fetches the hashes for good, existing graphs, that is, those graphs currently in use and those graphs planned to be used in the future. At operation 1104, the garbage collection logic 128 collects the set of referenced entity keys; these referenced keys are compared to the full set of entity keys (also obtained via operation 1006) to determine orphaned entity keys, which are then deleted along with their corresponding data blobs, along with any other keys/data that are not needed (operation 1108). The garbage collection logic 128 deletes the old mappings (operation 1110) and unlocks the mutex (operation 1112).

Note that any deleted information may be moved (e.g., to a hard drive) before or as part of deletion, e.g., archived for debugging, data analysis and the like. Further, note that the garbage collector, if relatively slow compared to the need for new graph generation, can be partially run, e.g., for a certain length of time, and then resumed at a later time. In general, however, for the current data in use, running the garbage collection operations once per day, which takes on the order of 30 seconds, has proved sufficient.

Figure 12:
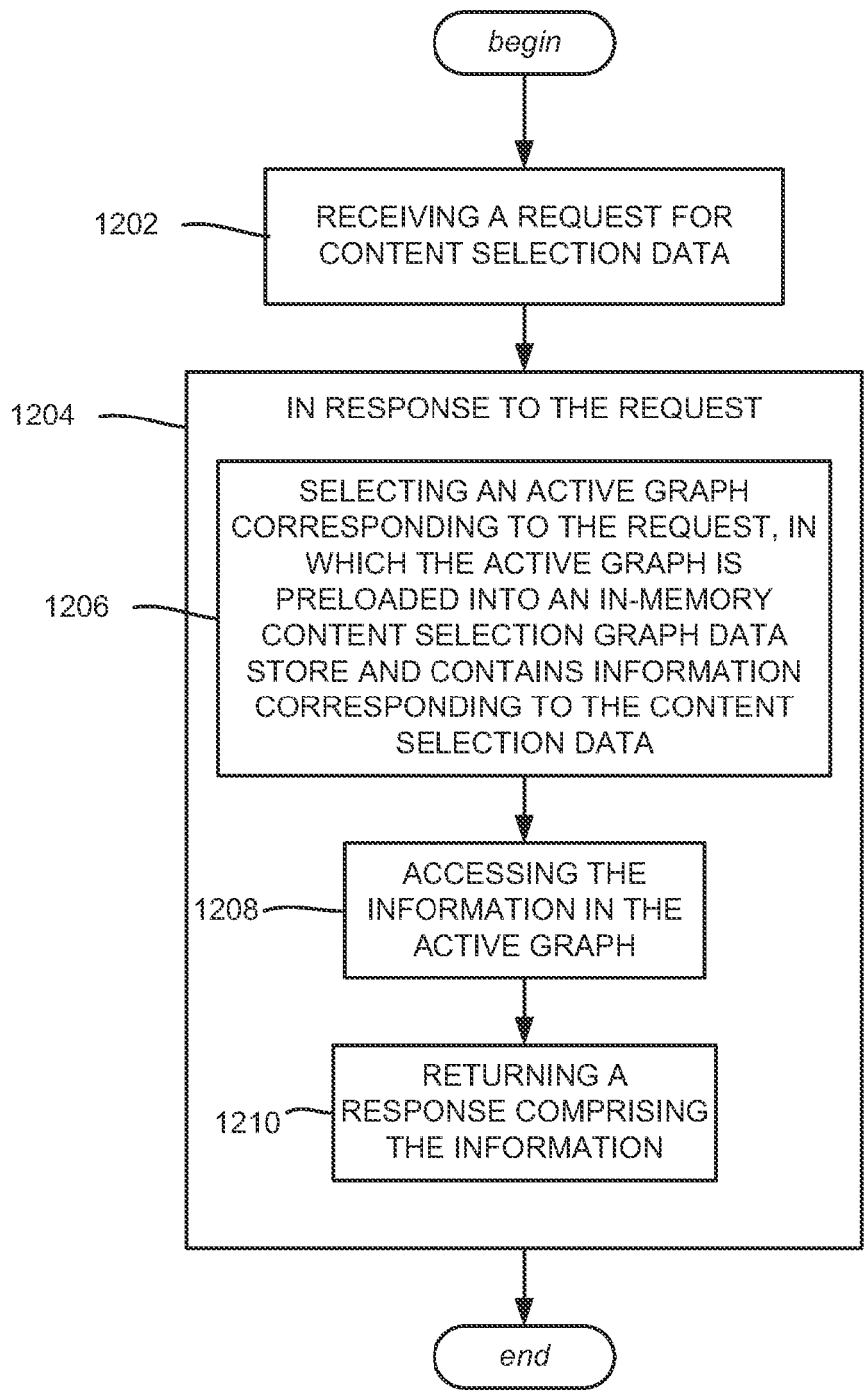
FIG. 12 is a flow diagram of example operations that return content selection data in response to a client request, in accordance with various aspects and example implementations of the subject disclosure.

One or more example aspects, such as corresponding to operations of a method, are represented in FIG. 12. Operation 1202 represents receiving a request for content selection data. In response to the request (block 1204), operation 1206 represents selecting an active graph corresponding to the request, in which the active graph is preloaded into an in-memory content selection graph data store and contains information corresponding to the content selection data, operation 1208 represents accessing the information in the active graph, and operation 1210 represents returning a response comprising the information.

Aspects can comprise preloading the active graph into the in-memory content selection graph data store in association with a start time at which the active graph becomes active, the active graph can comprise a graph of a plurality of graphs preloaded into the in-memory content selection graph data store, and selecting the active graph can comprise identifying the active graph from among the plurality of graphs based on a current time.

Identifying the active graph from among the plurality of graphs based on the current time can comprise locating the active graph by determining which graph is associated with a start time that is closest to and before the current time. Aspects can comprise maintaining mappings that relate identifiers of respective graphs of the plurality of graphs to respective start times.

Aspects can comprise generating the active graph to map to client-specific information, and preloading the active graph into the in-memory content selection graph data store; the active graph can comprise graph of a plurality of graphs preloaded into the in-memory content selection graph data store, and selecting the active graph can comprise identifying the active graph from among the plurality of graphs based on client-specific information associated with the request. Identifying the active graph from among the plurality of graphs based on the client-specific information associated with the request can comprise identifying the active graph based on at least one of: brand data, channel data, territory data, language data, device type data or software version data.

Aspects can comprise generating the active graph to map to client-specific information, and preloading the active graph into in-memory content selection graph data store in association with a start time at which the active graph becomes active; the active graph can comprise a graph of a plurality of graphs preloaded into the in-memory content selection graph data store, and wherein the selecting the active graph comprises identifying the active graph from among the plurality of graphs based on a current time and based on client-specific information associated with the request.

The request can indicate a graph node identifier corresponding to a graph node in the active graph; accessing the information in the active graph can comprise using the graph node identifier to locate the graph node, and returning the response comprising the information can comprise obtaining graph node data from the graph node and using at least part of the graph node data as the information.

Figure 13:
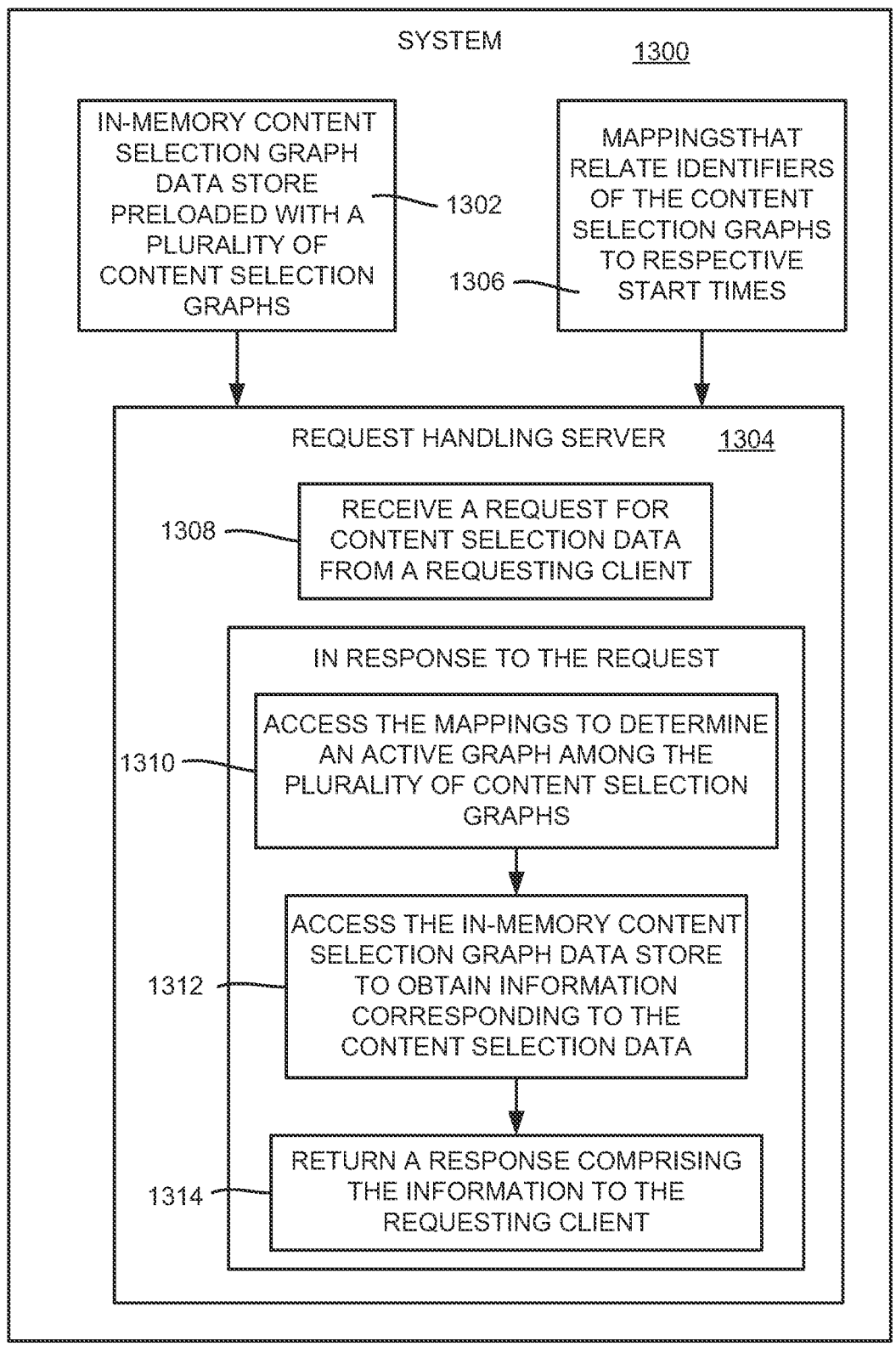
FIG. 13 is a block diagram of example components that can be used to respond to client requests for content selection graph information, in accordance with various aspects and example implementations of the subject disclosure.

One or more aspects can be embodied in a system 1300, such as represented in FIG. 13, (and for example can comprise a memory that stores computer executable components/instructions, and a processor that executes computer executable components/instructions stored in the memory). Example components can comprise an in-memory content selection graph data store (block 1302) preloaded with a plurality of content selection graphs and a request handling server (block 1304) coupled to the in-memory content selection graph data store, and coupled to mappings (block 1306) that relate identifiers of the content selection graphs to respective start times. The request handling server can be configured to receive a request for content selection data from a requesting client (block 1308). In response to the request, the request handling server can be configured to access the mappings to determine an active graph among the plurality of content selection graphs (block 1310), access the in-memory content selection graph data store to obtain information corresponding to the content selection data (block 1312), and return a response comprising the information to the requesting client (block 1314).

The request for the content selection data can comprise a graph node identifier representing a graph node in the active graph. The in-memory content selection graph data store can comprise a Redis cache. The request can be associated with client-specific information, and the request handling server can be configured to select the active graph based on the client-specific information. The client-specific information associated with the request can correspond to at least one of: brand data, channel data, territory data, language data, device type data and/or software version data.

The request can be associated with client-specific information, the active graph can comprise a graph of an active graph set associated with a common start time, and the request handling server can be further configured to select the active graph from the active graph set based on the client-specific information.

Figure 14:
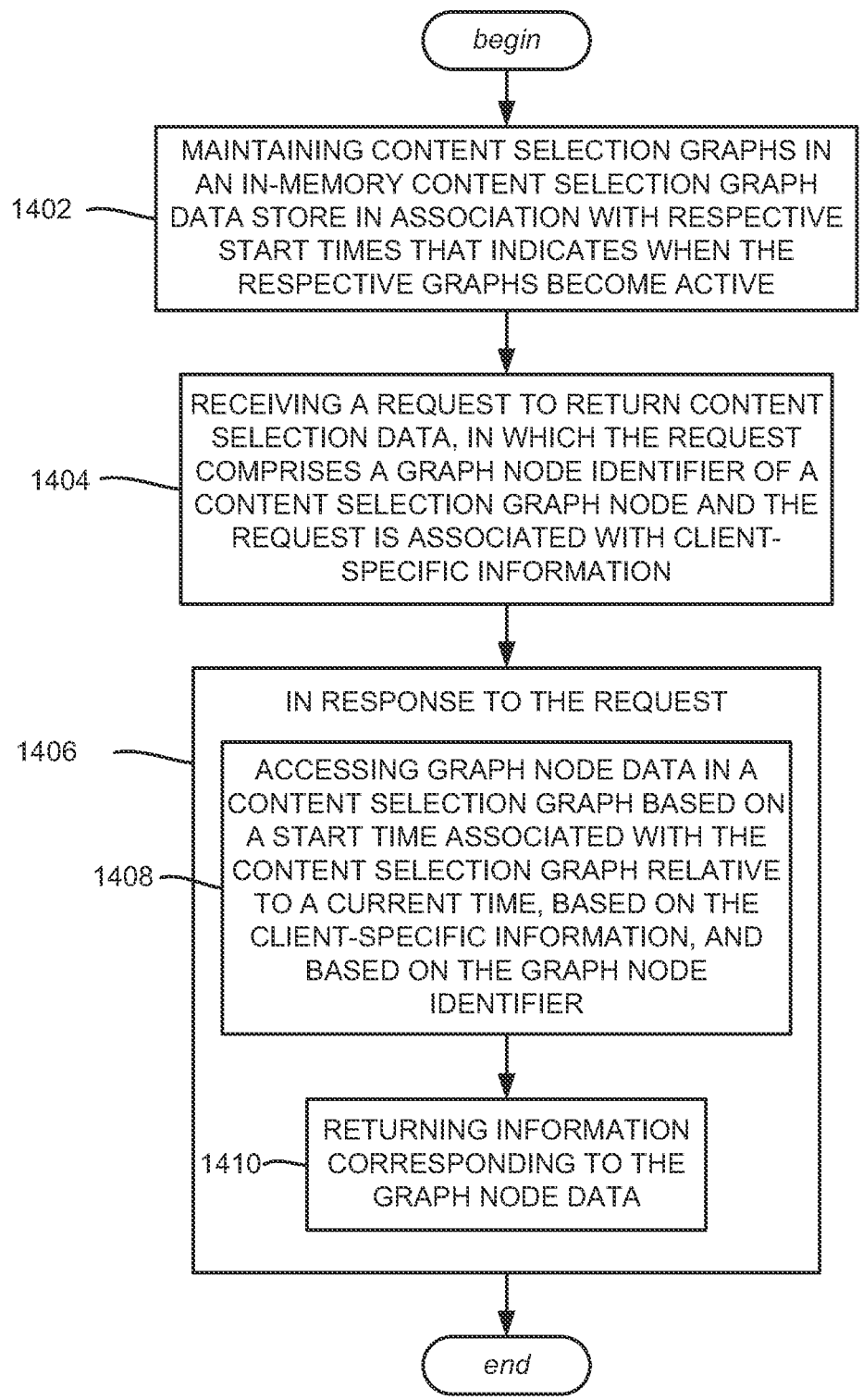
FIG. 14 is a flow diagram of example operations that can be used to respond to a client request for content selection graph information, in accordance with various aspects and example implementations of the subject disclosure.

FIG. 14 summarizes various example operations, e.g., corresponding to executable instructions of a machine-readable storage medium, in which the executable instructions, when executed by a processor, facilitate performance of the example operations. Operation 1402 represents maintaining content selection graphs in an in-memory content selection graph data store in association with respective start times that indicates when the respective graphs become active. Operation 1404 represents receiving a request to return content selection data, in which the request comprises a graph node identifier of a content selection graph node and the request is associated with client-specific information. In response to the request (block 1406), operation 1408 represents accessing graph node data in a content selection graph based on a start time associated with the content selection graph relative to a current time, based on the client-specific information, and based on the graph node identifier, and operation 1410 represents returning information corresponding to the graph node data.

Accessing the graph node data in the content selection graph based on the start time associated with the content selection graph relative to a current time can comprise accessing a mapping of start times to graph identifiers to select the content selection graph. Accessing the graph node data in the content selection graph based on the start time associated with the content selection graph relative to a current time can comprise accessing a mapping of start times-to-graph identifiers and client-specific information to select the content selection graph.

Accessing the graph node data in the content selection graph based on the start time associated with the content selection graph relative to a current time can comprise accessing mappings of start times-to-respective graph identifiers to select an active graph node set, and using the client-specific information to select the content selection graph from the active graph node set.

The in-memory content selection graph data store can comprise a Redis cache, and accessing the graph node data can comprise using Redis commands. Maintaining the content selection graphs can comprise maintaining prebuilt response information corresponding to the graph node data in the content selection graphs, and returning the information corresponding to the graph node data can comprise returning the prebuilt response information.

As can be seen, there is described a technology, for generating a preloaded content selection graph for use in rapid retrieval of content selection data. The technology facilitates building graphs/graph sets that become active at a specified time. The technology facilitates loading graphs/graph sets that correspond to client-specific information, and can have prebuilt responses therein to substantially reduce or eliminate the need for subsequent processing to return a response to a request, further facilitating rapid retrieval, including from the requesting client's perspective.

The techniques described herein can be applied to any device or set of devices (machines) capable of running programs and processes. It can be understood, therefore, that personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below in FIG. 15 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 15:
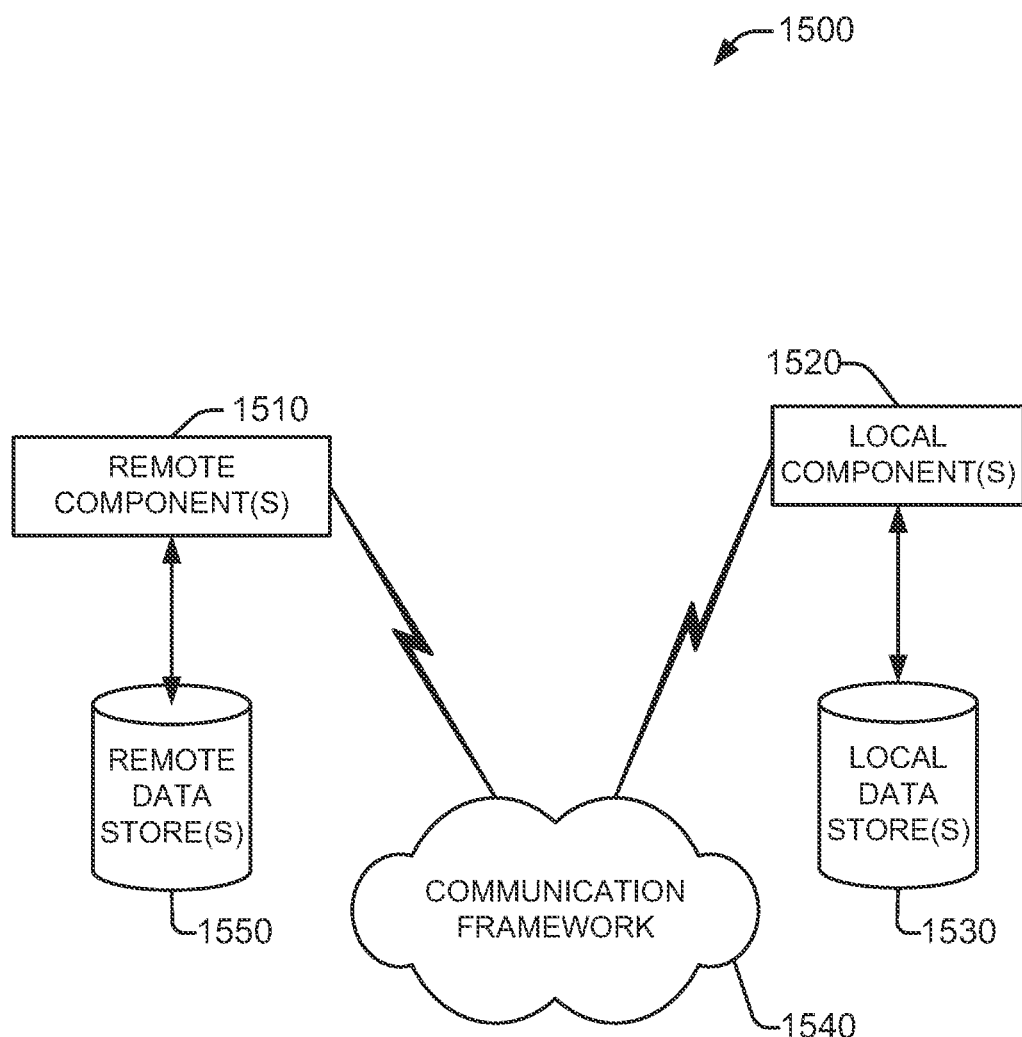
FIG. 15 is a block diagram representing an example computing environment into which aspects of the subject matter described herein may be incorporated.

FIG. 15 thus illustrates a schematic block diagram of a computing environment 1500 with which the disclosed subject matter can interact. The system 1500 comprises one or more remote component(s) 1510. The remote component(s) 1510 can be hardware and/or software (e.g., threads, processes, computing devices). In some embodiments, remote component(s) 1510 can be a distributed computer system, connected to a local automatic scaling component and/or programs that use the resources of a distributed computer system, via communication framework 1540. Communication framework 1540 can comprise wired network devices, wireless network devices, mobile devices, wearable devices, radio access network devices, gateway devices, femtocell devices, servers, etc.

The system 1500 also comprises one or more local component(s) 1520. The local component(s) 1520 can be hardware and/or software (e.g., threads, processes, computing devices). In some embodiments, local component(s) 1520 can comprise an automatic scaling component and/or programs that communicate/use the remote resources 1510 and 1520, etc., connected to a remotely located distributed computing system via communication framework 1540.

One possible communication between a remote component(s) 1510 and a local component(s) 1520 can be in the form of a data packet adapted to be transmitted between two or more computer processes. Another possible communication between a remote component(s) 1510 and a local component(s) 1520 can be in the form of circuit-switched data adapted to be transmitted between two or more computer processes in radio time slots. The system 1500 comprises a communication framework 1540 that can be employed to facilitate communications between the remote component(s) 1510 and the local component(s) 1520, and can comprise an air interface, e.g., Uu interface of a UMTS network, via a long-term evolution (LTE) network, etc. Remote component(s) 1510 can be operably connected to one or more remote data store(s) 1550, such as a hard drive, solid state drive, SIM card, device memory, etc., that can be employed to store information on the remote component(s) 1510 side of communication framework 1540. Similarly, local component(s) 1520 can be operably connected to one or more local data store(s) 1530, that can be employed to store information on the local component(s) 1520 side of communication framework 1540.

Figure 16:
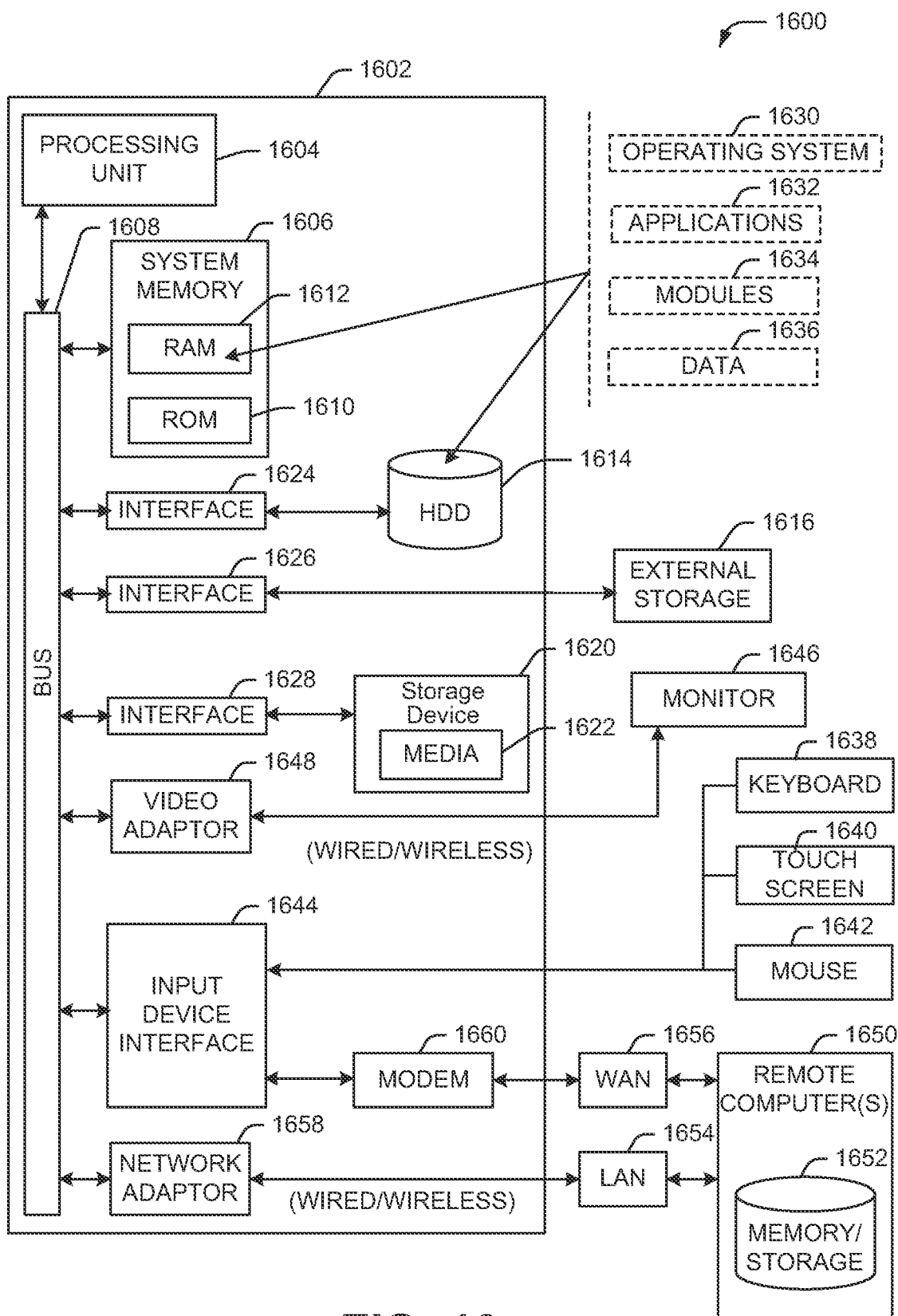
FIG. 16 depicts an example schematic block diagram of a computing environment with which the disclosed subject matter can interact, in accordance with various aspects and implementations of the subject disclosure.

In order to provide additional context for various embodiments described herein, FIG. 16 and the following discussion are intended to provide a brief, general description of a suitable computing environment 1600 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 16, the example environment 1600 for implementing various embodiments of the aspects described herein includes a computer 1602, the computer 1602 including a processing unit 1604, a system memory 1606 and a system bus 1608. The system bus 1608 couples system components including, but not limited to, the system memory 1606 to the processing unit 1604. The processing unit 1604 can be any of various commercially available processors. Dual microprocessors and other multi-processor architectures can also be employed as the processing unit 1604.

The system bus 1608 can be any of several types of bus structure that can further interconnect to a memory bus (with or without a memory controller), a peripheral bus, and a local bus using any of a variety of commercially available bus architectures. The system memory 1606 includes ROM 1610 and RAM 1612. A basic input/output system (BIOS) can be stored in a non-volatile memory such as ROM, erasable programmable read only memory (EPROM), EEPROM, which BIOS contains the basic routines that help to transfer information between elements within the computer 1602, such as during startup. The RAM 1612 can also include a high-speed RAM such as static RAM for caching data.

The computer 1602 further includes an internal hard disk drive (HDD) 1614 (e.g., EIDE, SATA), and can include one or more external storage devices 1616 (e.g., a magnetic floppy disk drive (FDD) 1616, a memory stick or flash drive reader, a memory card reader, etc.). While the internal HDD 1614 is illustrated as located within the computer 1602, the internal HDD 1614 can also be configured for external use in a suitable chassis (not shown). Additionally, while not shown in environment 1600, a solid state drive (SSD) could be used in addition to, or in place of, an HDD 1614.

Other internal or external storage can include at least one other storage device 1620 with storage media 1622 (e.g., a solid state storage device, a nonvolatile memory device, and/or an optical disk drive that can read or write from removable media such as a CD-ROM disc, a DVD, a BD, etc.). The external storage 1616 can be facilitated by a network virtual machine. The HDD 1614, external storage device(s) 1616 and storage device (e.g., drive) 1620 can be connected to the system bus 1608 by an HDD interface 1624, an external storage interface 1626 and a drive interface 1628, respectively.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1612, including an operating system 1630, one or more application programs 1632, other program modules 1634 and program data 1636. All or portions of the operating system, applications, modules, and/or data can also be cached in the RAM 1612. The systems and methods described herein can be implemented utilizing various commercially available operating systems or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In such an embodiment, operating system 1630 can comprise one virtual machine (VM) of multiple VMs hosted at computer 1602. Furthermore, operating system 1630 can provide runtime environments, such as the Java runtime environment or the .NET framework, for applications 1632. Runtime environments are consistent execution environments that allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and settings for an application.

Further, computer 1602 can be enable with a security module, such as a trusted processing module (TPM). For instance with a TPM, boot components hash next in time boot components, and wait for a match of results to secured values, before loading a next boot component. This process can take place at any layer in the code execution stack of computer 1602, e.g., applied at the application execution level or at the operating system (OS) kernel level, thereby enabling security at any level of code execution.

A user can enter commands and information into the computer 1602 through one or more wired/wireless input devices, e.g., a keyboard 1638, a touch screen 1640, and a pointing device, such as a mouse 1642. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1604 through an input device interface 1644 that can be coupled to the system bus 1608, but can be connected by other interfaces, such as a parallel port, an IEEE 1394 serial port, a game port, a USB port, an IR interface, a BLUETOOTH® interface, etc.

A monitor 1646 or other type of display device can be also connected to the system bus 1608 via an interface, such as a video adapter 1648. In addition to the monitor 1646, a computer typically includes other peripheral output devices (not shown), such as speakers, printers, etc.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device or other common network node, and typically includes many or all of the elements described relative to the computer 1602, although, for purposes of brevity, only a memory/storage device 1652 is illustrated. The logical connections depicted include wired/wireless connectivity to a local area network (LAN) 1654 and/or larger networks, e.g., a wide area network (WAN) 1656. Such LAN and WAN networking environments are commonplace in offices and companies, and facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired or wireless communication to the LAN 1654, which can also include a wireless access point (AP) disposed thereon for communicating with the adapter 1658 in a wireless mode.

When used in a WAN networking environment, the computer 1602 can include a modem 1660 or can be connected to a communications server on the WAN 1656 via other means for establishing communications over the WAN 1656, such as by way of the Internet. The modem 1660, which can be internal or external and a wired or wireless device, can be connected to the system bus 1608 via the input device interface 1644. In a networked environment, program modules depicted relative to the computer 1602 or portions thereof, can be stored in the remote memory/storage device 1652. It will be appreciated that the network connections shown are example and other means of establishing a communications link between the computers can be used.

When used in either a LAN or WAN networking environment, the computer 1602 can access cloud storage systems or other network-based storage systems in addition to, or in place of, external storage devices 1616 as described above. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances.

While the embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the various embodiments are not to be limited to any single implementation, but rather is to be construed in breadth, spirit and scope in accordance with the appended claims.

What is claimed is:

1. A system comprising:
a processor; and
a memory that stores executable instructions that, when executed by the processor, facilitate performance of operations, the operations comprising:
generating a first graph set associated with a first timepoint, the first graph set comprising a first graph associated with client-specific information;
loading the first graph set into cache memory;
generating a second graph set associated with a second timepoint, the second graph set comprising a second graph associated with the client-specific information;
loading the second graph set into the cache memory;
wherein the generating the first graph set and the generating the second graph set respectively further comprise generating, by the processor, time offset values corresponding to the first timepoint and to the second timepoint;
activating, by the processor from the cache memory, at the first timepoint, based upon first triggering, by the processor, based on a first time offset value of the time offset values, corresponding to the first timepoint, the first graph set as an active graph set for serving responses from the first graph set to client device requests, the serving comprising accessing the first graph of the first graph set based on a first client request associated with the client-specific information;
determining that the second timepoint is reached, based upon second triggering, by the processor, based on a second time offset value, of the time offset values, corresponding to the second timepoint, and in response to the determining, activating the second graph set, by the processor from the cache memory, as the active graph set for serving responses from the second graph set to client device requests, the serving comprising accessing the second graph of the second graph set based on a second client request associated with the client-specific information; and
prior to the activating of the second graph set, obtaining device identifying data from a client device in use after the first timepoint, the device identifying data comprising a device-specific display setting for the client device, and reformatting, by the processor, at least the second graph of the second graph set to conform to the device-specific display setting.

2. The system of claim 1, wherein the operations further comprise, in response to the determining, deactivating the first graph set as the active graph set for serving responses to client device requests, and removing, at a time that is after the second timepoint, the first graph set from the cache memory.

3. The system of claim 1, wherein the operations further comprise, at a time that is before the second timepoint, validating the second graph set.

4. The system of claim 1, wherein the client-specific information comprises at least one of: client device type data or client device software version data.

5. The system of claim 1, wherein the client-specific information comprises at least one of: brand data, channel data, territory data, or language data.

6. The system of claim 1, wherein the activating of the second graph set as the active graph set comprises accessing mapping data that relates the second timepoint to the second graph set.

7. The system of claim 1, wherein the accessing of the first graph of the first graph set based on the first client request associated with the client-specific information comprises obtaining response data prebuilt for the first client request based on the client-specific information.

8. The system of claim 1, wherein the client request is identical to the second client request, wherein the accessing of the first graph of the first graph set based on the first client request associated with the client-specific information comprises obtaining first response data prebuilt for the first client request based on the client-specific information, wherein the accessing of the second graph of the second graph set based on the second client request associated with the client-specific information comprises obtaining second response data prebuilt for the second client request based on the client-specific information, and wherein the first response data is different from the second response data.

9. The system of claim 1, wherein the operations further comprise, obtaining the device identifying data separately from obtaining the first client request.

10. The system of claim 1, wherein the operations further comprise,
prior to the activating of the second graph set, obtaining additional device identifying data, other than the device identifying data, from additional client devices, other than the client device, in use after the first timepoint, the additional device identifying data comprising additional device-specific display settings corresponding to the additional client devices; and
generating, by the processor, for at least the second graph of the second graph set, additional versions of the second graph to respectively conform to the additional device-specific display settings.

11. A non-transitory, machine-readable storage medium, comprising executable instructions that, when executed by a processor, facilitate performance of operations, the operations comprising:
generating, by the processor, a first graph set associated with a first timepoint, comprising generating, by the processor, a first time offset value corresponding to the first timepoint;
loading the first graph set associated with the first timepoint into cache memory, the first graph set comprising a first graph associated with first client-specific information and a second graph associated with second client-specific information;
activating, by the processor from the cache memory, at the first timepoint, based upon first triggering, by the processor, based on the first time offset value corresponding to the first timepoint, the first graph set as an active graph set for serving responses from the first graph set to client device requests, the serving comprising, in response to a first client request associated with the first client-specific information, returning first response data from the first graph, and in response to a second client request associated with the second client-specific information, returning second response data from the second graph; and
generating, by the processor, a second graph set associated with a second timepoint, that is later than the first timepoint, comprising generating, by the processor, a second time offset value corresponding to the second timepoint;
loading the second graph set, associated with the second timepoint into cache memory, the second graph set comprising a third graph associated with the first client-specific information and a fourth graph associated with the second client-specific information;

activating, by the processor from the cache memory, at the second timepoint, the second graph set as a second active graph set;

prior to the activating of the second graph set, obtaining device identifying data from a client device in use after the first timepoint, the device identifying data comprising a device-specific display setting for the client device; and reformatting, by the processor, at least the third graph of the second graph set to conform to the device-specific display setting.

12. The non-transitory, machine-readable storage medium of claim 11, wherein the operations further comprise maintaining a mapping between the first timepoint and the first graph set, the first graph set associated with the first timepoint via the mapping.

13. The non-transitory, machine-readable storage medium of claim 11, wherein the operations further comprise activating, at the second timepoint, the second graph set as the active graph set for serving responses from the second graph set to client device requests, the serving comprising, in response to a third client request associated with the first client-specific information, returning a third response from the third graph, and in response to a fourth client request associated with the second client-specific information, returning a fourth response from the fourth graph.

14. The non-transitory, machine-readable storage medium of claim 13, wherein the operations further comprise validating the second graph set at a time that is before the second timepoint, and deactivating the first graph set at a time that is after the second timepoint.

15. The non-transitory, machine-readable storage medium of claim 11, wherein the operations further comprise generating the first graph with prebuilt response data based on the client-specific information, the prebuilt response data comprising the first response data.

16. The non-transitory, machine-readable storage medium of claim 11, wherein the returning of the first response data from the first graph comprises accessing the first graph at a location in the cache memory based at least in part on the first client-specific information.

17. A method, comprising receiving at a first time, by a system comprising a processor, a first request for first graph node data, the first request associated with a first graph node identifier and first client-specific information;

determining, by the system, based upon a first triggering, by the system, based upon the first time being reach, the first graph node identifier and the first graph client-specific information, a first graph of a graph set, at a cache memory communicatively coupled to the processor, and a first location within the first graph;

accessing, by the system, the first location to obtain first response data;

returning, by the system, the first response data in response to the first request;

receiving, by the system at the first time, a second request for second graph node data, the second request associated with a second node identifier and second client-specific information;

determining, by the system, based also upon the first triggering, by the system, based upon the first time, the second node identifier and the second client-specific information, a second graph of the graph set, at the cache memory communicatively coupled to the processor, and a second location within the second graph;

accessing, by the system, the second location to obtain second response data;

returning, by the system, the second response data in response to the second request;

prior to the returning of the second response data, obtaining device identifying data from a client device in use after the first timepoint, the device identifying data comprising a device-specific display setting for the client device; and reformatting, by the processor, at least the second response data to conform to the device-specific display setting.

18. The method of claim 17, wherein the graph set is a first graph set, and further comprising:

receiving by the system at a second time, a third request for the first graph node data, the third request associated with the first graph node identifier and the first client-specific information;

determining, by the system, based on the second time, the first graph node identifier and the first graph client-specific information, a third graph of a second graph set and a third location within the third graph;

accessing, by the system, the third location to obtain third response data; and returning, by the system, the third response data in response to the third request.

19. The method of claim 18, further comprising:

receiving by the system at the second time, a fourth request for the second graph node data, the fourth request associated with the second graph node identifier and the second client-specific information;

determining, by the system, based on the second time, the second graph node identifier and the second graph client-specific information, a fourth graph of the second graph set and a fourth location within the fourth graph;

accessing, by the system, the fourth location to obtain fourth response data; and returning, by the system, the fourth response data in response to the fourth request.

20. The method of claim 18, further comprising deactivating the first graph set at a time that is after the second time.

* * * * *